United States Patent
Joo et al.

(10) Patent No.: US 11,092,733 B2
(45) Date of Patent: Aug. 17, 2021

(54) MICROSTRUCTURED LIGHT GUIDE PLATES AND DEVICES COMPRISING THE SAME

(71) Applicant: CORNING INCORPORATED, Corning, NY (US)

(72) Inventors: Byung Yun Joo, Ithaca, NY (US); Shenping Li, Painted Post, NY (US); Prantik Mazumder, Ithaca, NY (US); Wageesha Senaratne, Horseheads, NY (US); Amber Leigh Tremper, Painted Post, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/461,498

(22) PCT Filed: Nov. 16, 2017

(86) PCT No.: PCT/US2017/061970
§ 371 (c)(1),
(2) Date: May 16, 2019

(87) PCT Pub. No.: WO2018/094017
PCT Pub. Date: May 24, 2018

(65) Prior Publication Data
US 2019/0346614 A1    Nov. 14, 2019

Related U.S. Application Data

(60) Provisional application No. 62/447,989, filed on Jan. 19, 2017, provisional application No. 62/424,086, filed on Nov. 18, 2016.

(51) Int. Cl.
*F21V 8/00* (2006.01)

(52) U.S. Cl.
CPC ......... *G02B 6/0036* (2013.01); *G02B 6/0038* (2013.01); *G02B 6/0058* (2013.01);
(Continued)

(58) Field of Classification Search
CPC .. G02B 6/0036; G02B 6/0038; G02B 6/0058; G02B 6/0065; G02B 6/0068;
(Continued)

(56) References Cited

U.S. PATENT DOCUMENTS

| 8,264,622 B2 | 9/2012 | Gourley |
| 9,952,375 B2 | 4/2018 | Nolan et al. |

(Continued)

FOREIGN PATENT DOCUMENTS

| CN | 1797106 A | 7/2006 |
| CN | 201021784 Y | 2/2008 |

(Continued)

OTHER PUBLICATIONS

Hayashi et al., JP W2008-140084, Nov. 2008, machine translation (Year: 2008).*

(Continued)

*Primary Examiner* — Tracie Y Green

(57) ABSTRACT

Disclosed herein are light guide plates comprising a glass substrate having an edge surface and a light emitting surface and a polymeric film comprising a plurality of microstructures disposed on the light emitting surface. At least one light source may be coupled to the edge surface of the glass substrate. The light guides disclosed herein may exhibit reduced light attenuation and/or color shift. Display and lighting devices comprising such light guide plates are further disclosed.

47 Claims, 11 Drawing Sheets

(52) U.S. Cl.
CPC ......... *G02B 6/0065* (2013.01); *G02B 6/0068* (2013.01); *G02B 6/0076* (2013.01)

(58) Field of Classification Search
CPC .. G02B 6/0076; G02B 6/0073; G02B 6/0053; G02B 6/0051
See application file for complete search history.

(56) References Cited

U.S. PATENT DOCUMENTS

| | | | |
|---|---|---|---|
| 9,989,692 B2 | 6/2018 | Etienne et al. | |
| 2003/0144125 A1* | 7/2003 | Anma | C03C 21/005 501/66 |
| 2005/0128387 A1* | 6/2005 | Sone | G02F 1/133555 349/114 |
| 2007/0047258 A1* | 3/2007 | Yao | G02B 6/0061 362/615 |
| 2008/0014410 A1* | 1/2008 | Johnston | B29C 55/06 428/141 |
| 2008/0112187 A1* | 5/2008 | Katsumata | G02B 6/0076 362/611 |
| 2008/0232135 A1* | 9/2008 | Kinder | G02B 6/0053 362/615 |
| 2011/0157521 A1 | 6/2011 | Shimazaki et al. | |
| 2011/0299012 A1 | 12/2011 | Wang et al. | |
| 2012/0147296 A1 | 6/2012 | Montgomery et al. | |
| 2014/0056029 A1 | 2/2014 | He et al. | |
| 2014/0140091 A1* | 5/2014 | Vasylyev | G02B 6/0045 362/606 |
| 2015/0368146 A1 | 12/2015 | Ellison et al. | |
| 2016/0033707 A1* | 2/2016 | Lee | G02B 6/0036 362/607 |
| 2016/0238778 A1* | 8/2016 | Hijiya | C03C 4/0092 |
| 2018/0217300 A1* | 8/2018 | Boyd | C25D 3/38 |
| 2018/0364415 A1* | 12/2018 | Shim | C03C 3/091 |
| 2019/0146139 A1* | 5/2019 | Joo | G02B 6/0055 362/613 |
| 2019/0146140 A1 | 5/2019 | Joo et al. | |
| 2019/0339440 A1* | 11/2019 | Bookbinder | G02B 6/0036 |

FOREIGN PATENT DOCUMENTS

| | | |
|---|---|---|
| CN | 101440935 A | 5/2009 |
| CN | 201803317 U | 4/2011 |
| CN | 102105833 A | 6/2011 |
| CN | 102425745 A | 4/2012 |
| CN | 102620202 A | 8/2012 |
| CN | 103150062 A | 6/2013 |
| CN | 105319641 A | 2/2016 |
| CN | 105353440 A | 2/2016 |
| CN | 105353441 A | 2/2016 |
| CN | 105372750 A | 3/2016 |
| CN | 109312909 A | 2/2019 |
| EP | 762182 A1 | 3/1997 |
| JP | 2004309801 A | 11/2004 |
| JP | 2012226290 A | 11/2012 |
| KR | 2011025555 A | 3/2011 |
| KR | 2012116161 A | 10/2012 |
| KR | 1613727 B1 | 4/2016 |
| KR | 2016045235 A | 4/2016 |
| TW | 201022785 A | 6/2010 |
| TW | 201534987 A | 9/2015 |
| TW | 201612572 A | 4/2016 |
| WO | 2008140084 A1 | 11/2008 |
| WO | WO-2015116743 A1 * | 8/2015 ........... G02B 5/0268 |

OTHER PUBLICATIONS

JP2012-226290, Nov. 2012, machine translation (Year: 2012).*
Masazuki, JP2004-309801, Nov. 2004, machine translation (Year: 2004).*
English Translation of CN201780071635.2 Office Action dated Apr. 15, 2020; 13 Pages; Chinese Office Patent.
International Search Report and Written Opinion of the International Searching Authority; PCT/US2017/061970; dated Feb. 12, 2018; 15 Pages; European Patent Office.
Jung et al; "P-87: Local Dimming Design and Optimization for Edge-Type LED Backlight Unit" ; SID 11 Digest, 2011; pp. 1430-1432.
Chinese Patent Application No. 201780071635.2 Second Office Action dated Sep. 7, 2020; 14 Pages; Chinese Patent Office.
Gao et al., Design and Simulation of Microstructure in Integrated Light Guide Plate, Optical Technology, vol. 34, Issue 5, 2008, pp. 690-692.
Hrabe et al., Effects of processing on microstructure and mechanical properties of a titanium alloy (Ti—6Al—4V) fabricated using electron beam melting (EBM), Part 2: Energy input, orientation, and location, vol. 573, 2013, pp. 271-277.
Chinese Patent Application No. 201780071635.2, Office Action dated Mar. 22, 2021, 14 pages (English Translation Only); Chinese Patent Office.
Taiwanese Patent Application No. 106139932, Office Action dated Apr. 1, 2021, 5 pages (English Translation Only); Taiwanese Patent Office.

* cited by examiner

MICROSTRUCTURED LIGHT GUIDE PLATES AND DEVICES COMPRISING THE SAME

CROSS-REFERENCE TO RELATED APPLICATIONS

This application is a national stage entry of International Patent Application Serial No. PCT/US2017/061970, filed on Nov. 16, 2017, which in turn, claims the benefit of priority under 35 U.S.C. § 119 of U.S. Provisional Application Ser. No. 62/424,086 filed on Nov. 18, 2016 and U.S. Provisional Application Ser. No. 62/447,989 filed on Jan. 19, 2017, the contents of each of which are relied upon and incorporated herein by reference in their entireties.

FIELD OF THE DISCLOSURE

The disclosure relates generally to light guide plates and display or lighting devices comprising such light guide plates, and more particularly to glass light guide plates comprising a microstructured polymeric film.

BACKGROUND

Liquid crystal displays (LCDs) are commonly used in various electronics, such as cell phones, laptops, electronic tablets, televisions, and computer monitors. However, LCDs can be limited as compared to other display devices in terms of brightness, contrast ratio, efficiency, and viewing angle. For instance, to compete with other display technologies, there is a continuing demand for higher contrast ratio, color gamut, and brightness in conventional LCDs while also balancing power requirements and device size (e.g., thickness).

LCDs can comprise a backlight unit (BLU) for producing light that can then be converted, filtered, and/or polarized to produce the desired image. BLUs may be edge-lit, e.g., comprising a light source coupled to an edge of a light guide plate (LGP), or back-lit (direct-lit), e.g., comprising a two-dimensional array of light sources disposed behind the LCD panel. Direct-lit BLUs may have the advantage of improved dynamic contrast as compared to edge-lit BLUs. For example, a display with a direct-lit BLU can independently adjust the brightness of each LED to optimize the dynamic range of the brightness across the image. This is commonly known as local dimming. However, to achieve desired light uniformity and/or to avoid hot spots in direct-lit BLUs, the light source(s) may be positioned at a distance from the LGP, thus making the overall display thickness greater than that of an edge-lit BLU. In traditional edge-lit BLUs, the light from each LED can spread across a large region of the LGP such that turning off individual LEDs or groups of LEDs may have only a minimal impact on the dynamic contrast ratio.

One dimensional local dimming allows for various high end LCDs attributes, such as, high dynamic range (contrast), high refresh rates, and energy savings. The local dimming efficiency of an LGP can be enhanced, for example, by providing one or more microstructures on the LGP surface. For instance, plastic LGPs, such as polymethyl methacrylate (PMMA) or methyl methacrylate styrene (MS) LGPs, can be fabricated with surface microstructures that may confine the light from each LED within a narrow band. In this way, it may be possible to adjust the brightness of the light source(s) along the edge of the LGP to enhance the dynamic contrast of the display. If LEDs are mounted on two opposing sides of the LGP, the brightness of pairs of LEDs can be adjusted to produce a brightness gradient along the bands of illumination that may further improve the dynamic contrast.

Methods for providing microstructures on plastic materials can include, for example, injection molding, extruding, and/or embossing. While these techniques may work well with plastic LGPs, they can be incompatible with glass LGPs due to their higher glass transition temperature and/or higher viscosity. However, glass LGPs may offer various improvements over plastic LGPs, e.g., in terms of their low light attenuation, low coefficient of thermal expansion, and high mechanical strength. As such, it may be desirable to use glass as an alternative material of construction for LGPs to overcome various drawbacks associated with plastics. For instance, due to their relatively weak mechanical strength and/or lower stiffness, it can be difficult to make plastic LGPs that are both sufficiently large and thin to meet current consumer demands. Plastic LGPs may also necessitate a larger gap between the light source and LGP due to high coefficients of thermal expansion, which can reduce optical coupling efficiency and/or require a larger display bezel. Additionally, plastic LGPs may have a higher propensity to absorb moisture and swell as compared to glass LGPs.

Providing plastic or polymer microstructures on glass LGPs may, however, pose several issues. One issue is that significant color shift through the LGP can be introduced by the plastic microstructures because of the higher optical attenuation of plastic materials. Another issue is the reliability resultant from the difference between the CTEs of plastic and glass. For example, the CTE of plastic materials is much higher than that of glass materials; thus, variations of environmental temperature and humidity can result in delamination between plastic microstructures and an adjacent glass LGP.

Accordingly, it would be advantageous to provide glass LGPs having improved local dimming efficiency, e.g., glass LGPs with microstructures on at least one surface thereof which can reduce color shift but also address conventional reliability issues. It would also be advantageous to provide backlights having a thickness similar to that of edge-lit BLUs while also providing local dimming capabilities similar to that of back-lit BLUs.

SUMMARY

The disclosure relates, in various embodiments, to light guide assemblies comprising a light guide plate including a glass substrate comprising an edge surface and a light emitting surface, a polymeric film comprising a plurality of microstructures disposed on the light emitting surface of the glass substrate, and at least one light source optically coupled to the edge surface of the glass substrate. Also disclosed herein are light guide plates comprising a glass substrate comprising an edge surface and a light emitting surface, and a polymeric film comprising a plurality of microstructures disposed on the light emitting surface of the glass substrate. Exemplary microstructures can include a height h and a width w which define an aspect ratio wherein the aspect ratio is between 2-8. In further embodiments, the height h of each of the plurality of microstructures does not exceed 20 microns. In other embodiments, the thickness of the polymeric platform does not exceed 15 microns. In some embodiments, the sum of the height h and the thickness t does not exceed 25 microns in total. In non-limiting embodiments, a color shift $\Delta y$ of the light guide plate may be less than about 0.015. Display, lighting, and electronic devices comprising such light guides are also disclosed herein.

In further embodiments, the microstructures can be provided in a discontinuous array wherein predetermined spacing can be provided between adjacent microstructures or lenticular lenses in an array, e.g., one dimensional discontinuity. In yet further embodiments the microstructures can be discontinuous in two dimensions wherein predetermined spacing can be provided between adjacent microstructures or lenticular lenses in an array and one or more lenticular lenses can be discontinuous along the respective lenticular direction.

Thus, in some embodiments a light guide assembly is provided comprising a light guide plate with a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, and at least one light source optically coupled to the edge surface of the glass substrate, wherein the aspect ratio is represented as $w/d_2$ and is between 0.1 and 8. In further embodiments, a light guide assembly is provided comprising a light guide plate with a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, and at least one light source optically coupled to the edge surface of the glass substrate, wherein the aspect ratio is represented as $w/[d_2-t]$ and is between 0.1 and 8. In further embodiments, the aspect ratio is between 2 and 5. In some embodiments, the polymeric film further comprises a polymeric platform having a thickness t, and wherein the aspect ratio is represented as $(w/[d_2-t])$. In some embodiments, the height $d_2$ of each of the plurality of microstructures does not exceed 20 µm. In some embodiments, w is between about 5 µm and about 500 µm. Some embodiments further comprise a first spacing between adjacent microstructures in a first direction, the first spacing being between 0.01*w and 4*w. In some embodiments, the first spacing is different between ones of the plurality of microstructures. In some embodiments, a second spacing between two adjacent microstructures in a second direction orthogonal to the first direction is between 10 µm and 5000 µm. In some embodiments, the second spacing is different between ones of the plurality of microstructures. In some embodiments, each of the plurality of microstructures further comprises a length l, and wherein l is different between ones of the plurality of microstructures. In some embodiments, a slope angle of an end surface of ones of the plurality of microstructure is less than about 15 degrees. In some embodiments, the substrate and the plurality of microstructures comprise the same material. In some embodiments, a refractive index difference between the substrate and the plurality of microstructures is less than 10%. In some embodiments, the thickness t of the polymeric platform does not exceed 15 microns. In some embodiments, the sum of the height $d_2$ and the thickness t does not exceed 25 microns in total. In some embodiments, the glass substrate comprises a color shift $\Delta y$ of less than about 0.015. In some embodiments, the glass substrate comprises, on a mol % oxide basis: 50-90 mol % $SiO_2$, 0-20 mol % $Al_2O_3$, 0-20 mol % $B_2O_3$, and 0-25 mol % $R_xO$, wherein x is 2 and R is chosen from Li, Na, K, Rb, Cs, and combinations thereof, or wherein x is 1 and R is chosen from Zn, Mg, Ca, Sr, Ba, and combinations thereof. In some embodiments, a thickness $d_1$ of the glass substrate ranges from about 0.1 mm to about 3 mm. In some embodiments, the polymeric film comprises a UV curable or thermally curable polymer. In some embodiments, the polymeric film is microreplicated, screen printed, ink jet printed, laser bonded, printed, or grown onto the light emitting surface of the glass substrate. In some embodiments, the plurality of microstructures comprises a periodic or non-periodic array of prisms, rounded prisms, or lenticular lenses. In some embodiments, the glass substrate further comprises a plurality of light extraction features patterned on a major surface opposite the light emitting surface. Some embodiments further comprise at least one second light source optically coupled to a second edge surface of the glass substrate and, optionally, a second polymeric film comprising a plurality of microstructures disposed on a major surface opposite the light emitting surface.

In further embodiments a light guide plate is provided comprising a glass substrate having an edge surface and a light emitting surface and a polymeric film disposed adjacent to the light emitting surface of the glass substrate, the polymeric film comprising a plurality of microstructures, each microstructure having a height $d_2$ and a width w defining an aspect ratio, wherein the aspect ratio is represented as $w/d_2$ and is between 0.1 and 8. In additional embodiments a light guide plate is provided comprising a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, wherein the aspect ratio is represented as $w/[d_2-t]$ and is between 0.1 and 8. In some embodiments, the aspect ratio is between 2 and 5. In some embodiments, the polymeric film further comprises a polymeric platform having a thickness t, and wherein the aspect ratio is represented as $(w/[d_2-t])$. In some embodiments, the height $d_2$ of each of the plurality of microstructures does not exceed 20 µm. In some embodiments, w is between about 5 µm and about 500 µm. In some embodiments, a first spacing between two adjacent microstructures in a first direction is between 0.01*w and 4*w. In some embodiments, the first spacing is different between ones of the plurality of microstructures. In some embodiments, a second spacing between two adjacent microstructures in a second direction orthogonal to the first direction is between 10 µm and 5000 µm. In some embodiments, the second spacing is different between ones of the plurality of microstructures. In some embodiments, each of the plurality of microstructures further comprises a length l, and wherein l is different between ones of the plurality of microstructures. In some embodiments, a slope angle of an end surface of ones of the plurality of microstructures is less than about 10 degrees. In some embodiments, the substrate and the plurality of microstructures comprise the same material. In some embodiments, a refractive index difference between the substrate and the plurality of microstructures is less than 15%. In some embodiments, the thickness t of the polymeric platform does not exceed 15 microns. In some embodiments, the sum of the height $d_2$ and the thickness t does not exceed 25 microns in total. In some embodiments, the glass substrate comprises a color shift $\Delta y$ of less than about 0.015. In some embodiments, the glass substrate comprises, on a mol % oxide basis: 50-90 mol % $SiO_2$, 0-20 mol % $Al_2O_3$, 0-20 mol % $B_2O_3$, and 0-25 mol % $R_xO$, wherein x is 2 and R is chosen from Li, Na, K, Rb, Cs, and combinations thereof, or wherein x is 1 and R is chosen from Zn, Mg, Ca, Sr, Ba, and combinations thereof. In some embodiments, a thickness $d_1$ of the glass substrate ranges from about 0.1 mm to about 3 mm. In some embodiments, the polymeric film comprises a UV curable or thermally curable polymer. In some embodiments, the polymeric film is microreplicated, screen printed, ink jet printed, laser bonded, printed, or grown onto the light emitting surface of the glass substrate. In some embodiments, the plurality of microstructures comprises a periodic or non-periodic array of prisms, rounded prisms, or lenticular lenses. In some embodiments, the glass substrate further comprises a plurality of light extraction features patterned on a major surface opposite the light emitting surface. Some embodiments comprise at least one second light source optically coupled to a second edge surface of the glass substrate and, optionally, a second polymeric film comprising a plurality of microstructures disposed on a major surface opposite the light emitting surface.

According to various embodiments, the glass substrate may comprise 50-90 mol % $SiO_2$, 0-20 mol % $Al_2O_3$, 0-20 mol % $B_2O_3$, 0-25 mol % $R_xO$, where x is 1 or 2 and R is Li, Na, K, Rb, Cs, Zn Mg, Ca, Sr, Ba, and combinations thereof. In additional embodiments, the glass substrate may comprise less than about 1 ppm each of Co, Ni, and Cr. A thickness of the glass substrate may range from about 0.1 mm to about 3 mm, whereas a thickness of the polymeric film may range from about 10 μm to about 500 μm.

In certain embodiments, the polymeric film may comprise a UV curable or thermally curable polymer, which may be molded onto the light emitting surface of the glass substrate. The polymeric film may, for example, comprise a periodic or non-periodic microstructure array comprising prisms, rounded prisms, or lenticular lenses. An aspect ratio of the microstructures may range, for example, from about 0.1 to about 3. An aspect ratio of the microstructures may range in other embodiments, for example, from about 2 to about 5. According to non-limiting embodiments, a major surface opposite the light emitting surface may be patterned with a plurality of light extraction features.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Disclosed herein are light guide assemblies comprising a light guide plate including a glass substrate having an edge surface and a light emitting surface, a polymeric film comprising a plurality of microstructures disposed on the light emitting surface of the glass substrate, and at least one light source optically coupled to the edge surface of the glass substrate.

Also disclosed herein are light guide plates comprising a glass substrate having an edge surface and a light emitting surface, a polymeric film comprising a plurality of microstructures disposed on the light emitting surface of the glass substrate, and a combined light attenuation α' of less than about 5 dB/m for wavelengths ranging from about 420-750 nm.

Various devices comprising such light guides are also disclosed herein, such as display, lighting, and electronic devices, e.g., televisions, computers, phones, tablets, and other display panels, luminaires, solid-state lighting, billboards, and other architectural elements, to name a few.

Various embodiments of the disclosure will now be discussed with reference to the figures, which illustrate exemplary embodiments of microstructure arrays and light guide plates. The following general description is intended to provide an overview of the claimed devices, and various aspects will be more specifically discussed throughout the disclosure with reference to the non-limiting depicted embodiments, these embodiments being interchangeable with one another within the context of the disclosure.

Figure 1A:
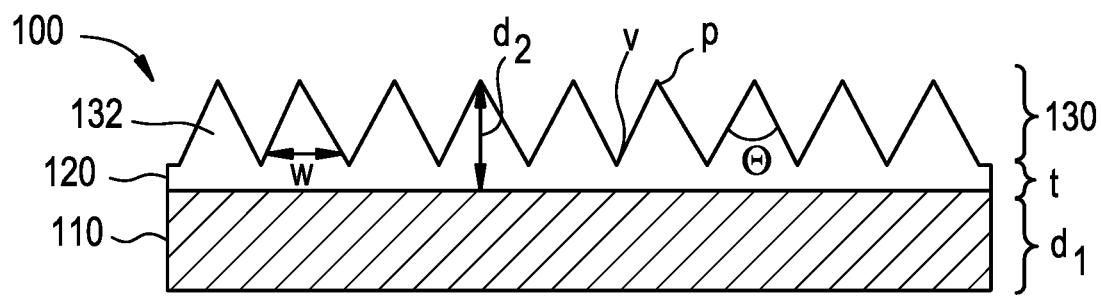
FIGS. 1A-1D illustrate exemplary microstructure arrays according to various embodiments of the disclosure.
Figure 1B:
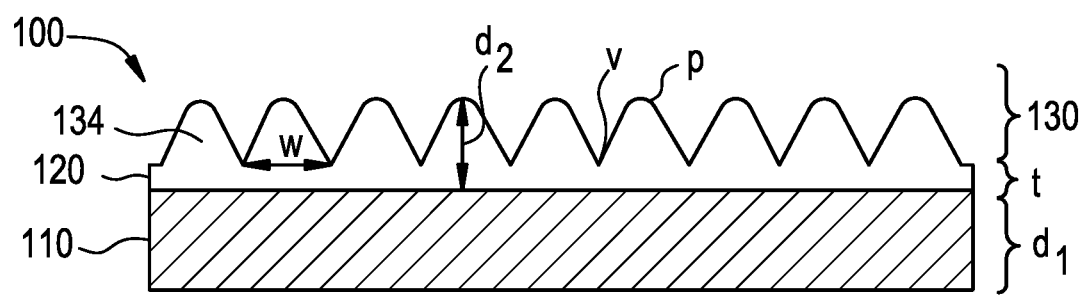
Figure 1C:
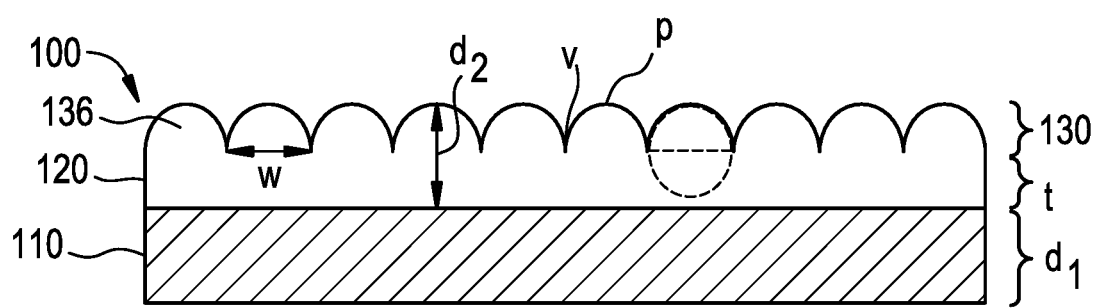
Figure 1D:
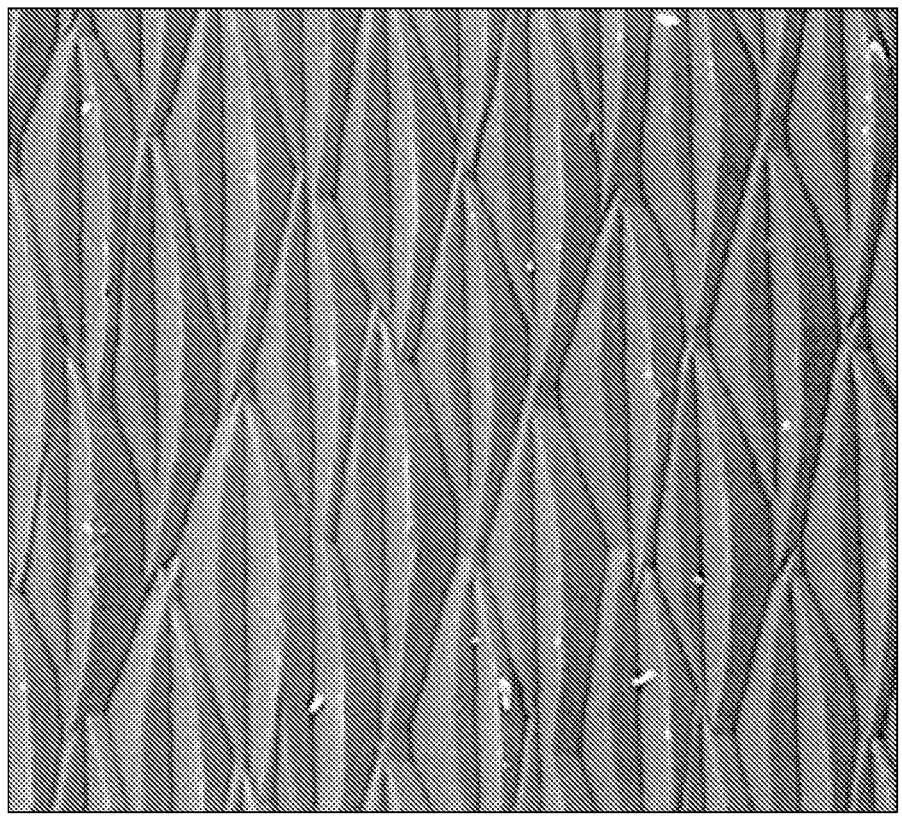

FIGS. 1A-1D illustrate various exemplary embodiments of a light guide plate (LGP) 100 comprising a glass substrate 110 and a polymeric film comprising a polymeric platform 120 and comprising a plurality of microstructures 130. In FIGS. 1A-B the microstructures 130 comprise prisms 132 and rounded prisms 134, respectively, positioned on the polymeric platform 120. As shown in FIG. 1C, the microstructures 130 may also comprise lenticular lenses 136 positioned on the polymeric platform 120. Of course, in some embodiments the microstructures 130 may be positioned or provided directly on the glass substrate as shown in FIGS. 2A-2C, 3A-3C, 4A-4C, and 5A-5C. Of course, the depicted microstructures are exemplary only and are not intended to limit the appending claims. Other microstructure shapes are possible and intended to fall within the scope of the disclosure. Furthermore, while FIGS. 1A-1C illustrate regular (or periodic) arrays, it is also possible to use an irregular (or non-periodic) array (see FIG. 1D and FIGS. 2A-2C, 3A-3C, 4A-4C, and 5A-5C. For instance, FIG. 1D is an SEM image of a microstructured surface comprising a non-periodic array of prisms.

With reference to FIG. 1A, the prism microstructures 132 can have a prism angle $\Theta$ ranging from about 60° to about 120°, such as from about 70° to about 110°, from about 80° to about 100°, or about 90°, including all ranges and subranges therebetween. Referring to FIGS. 1B and 1C, the lenticular lens microstructures 134, 136 can have any given cross-sectional shape (as illustrated by the dashed lines of FIG. 1C), ranging from semi-circular, semi-elliptical, parabolic, or other similar rounded shapes.

Figure 2A:
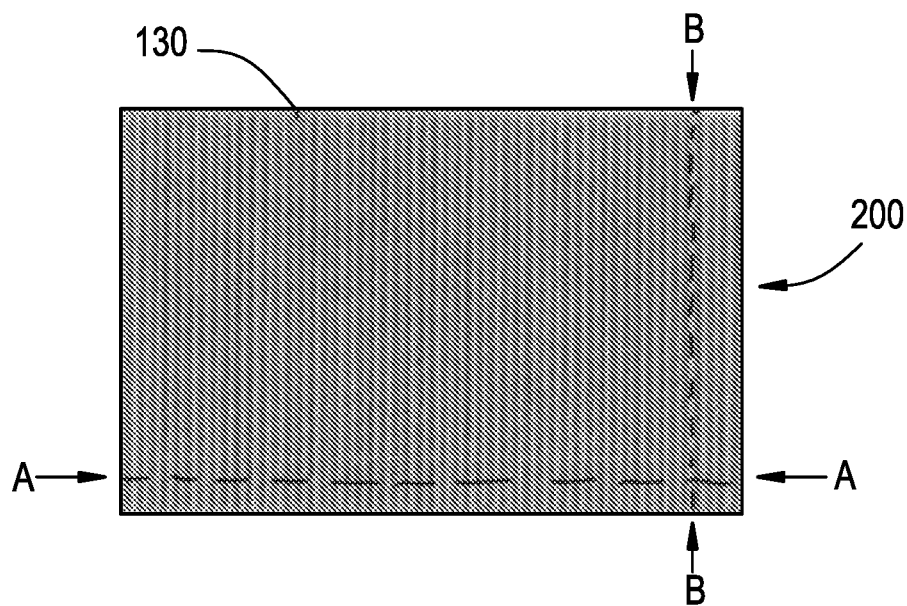
FIGS. 2A-2C illustrate exemplary microstructure arrays according to additional embodiments of the disclosure.
Figure 2B:
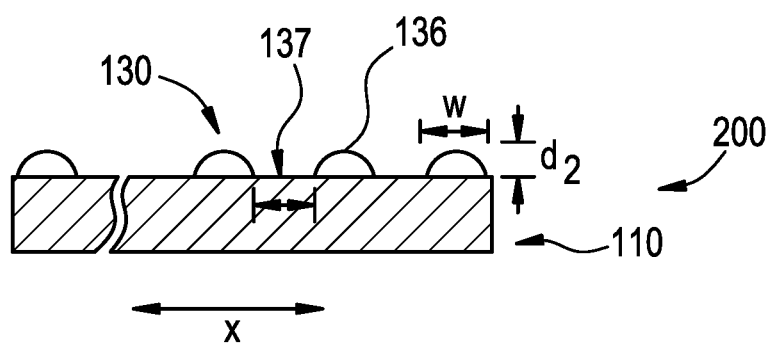
Figure 2C:
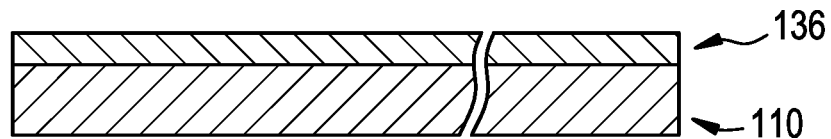

As noted above, FIGS. 2A-2C illustrate an additional exemplary embodiments of a LGP 200 comprising a glass substrate 110 and polymeric film comprising a plurality of microstructures 130. A top view of an exemplary LGP 200 is illustrated in FIG. 2A. FIG. 2B is a side view of the LGP 200 of FIG. 2A along line A-A, and FIG. 2C is a side view of the LGP 200 of FIG. 2A along line B-B. With reference to FIGS. 2A-2C, a plurality of microstructures 130 comprising lenticular lenses 136 is shown provided directly on the glass substrate 110 without a polymeric platform. Each lenticular lens 136 comprises a predetermined width w and height d2 as measured from the glass substrate 110. The width w and height d2 may be the same for each lenticular lens 136 in an array of lenses contained on the LGP 200 or may be different among the array. As shown, a predetermined spacing 137 may be provided between adjacent lenticular lenses 136 in an array. This spacing 137 may be constant (periodic) between each lenticular lens 136 in the array or may be discontinuous, graduated, or otherwise irregular (non-periodic) between adjacent lenticular lenses 136 in the array. The spacing 137 may range from 0.01*w to about 4.0*w, from 0.05*w to about 3.0*w, or from 0.1*w to about 2.0*w. Thus, in exemplary embodiments one dimensional dimming can be achieved through the combination of the aspect ratio of the lenticular lenses 136 and the spacing between lenticular lenses 136 in a first direction x to achieve efficient light confinement.

Figure 3A:
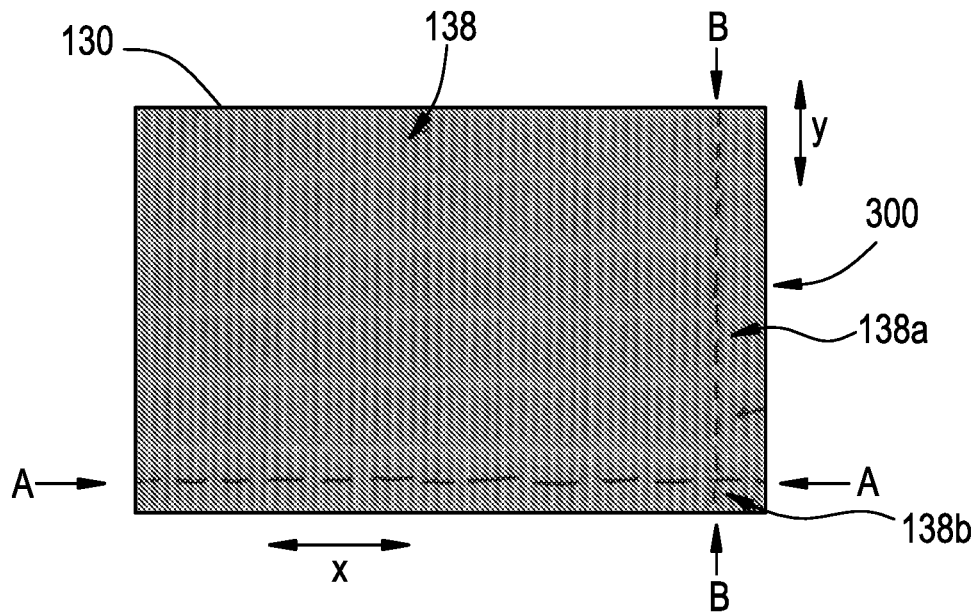
FIGS. 3A-3C illustrate exemplary microstructure arrays according to further embodiments of the disclosure.
Figure 3B:
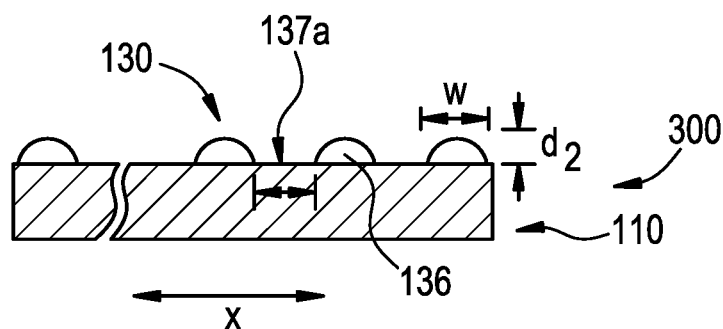
Figure 3C:
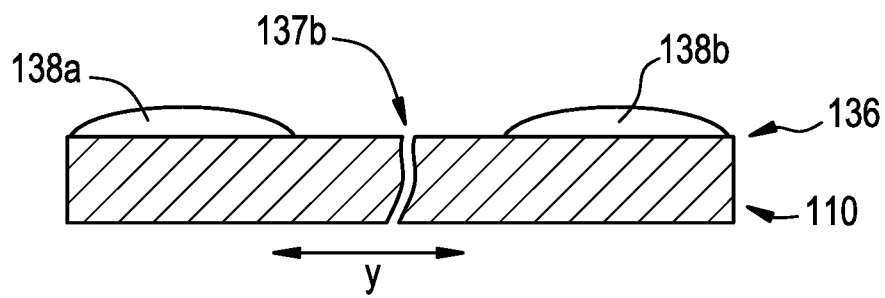

FIGS. 3A-3C illustrate exemplary embodiments of a LGP 300 comprising a glass substrate 110 and polymeric film comprising a plurality of microstructures 130. A top view of an exemplary LGP 300 is illustrated in FIG. 3A. FIG. 3B is a side view of the LGP 300 of FIG. 3A along line A-A, and FIG. 3C is a side view of the LGP 300 of FIG. 3A along line B-B. With reference to FIGS. 3A-3C, a plurality of microstructures 130 comprising lenticular lenses 136 is shown provided directly on the glass substrate 110 without a polymeric platform. Each lenticular lens 136 comprises a predetermined width w and height d2 as measured from the glass substrate 110 as well as a length l. The width w and height d2 may be the same for each lenticular lens 136 in an array 138 of lenses contained on a LGP 300 or may be different among the array 138; however, as shown the lenticular lenses 136 may each have the same length l in an array 138 and/or between each array. As shown, a predetermined spacing 137a may be provided between adjacent lenticular lenses 136 in a first direction x in an array 138. This spacing 137a may be constant (periodic) between each lenticular lens 136 in the array 138 or may be discontinuous, graduated, or otherwise irregular (non-periodic) between adjacent lenticular lenses 136 in the array 138. The spacing 137a may range from 0.01*w to about 4.0*w, from 0.05*w to about 3.0*w, or from 0.1*w to about 2.0*w. A predetermined spacing 137b may also be provided between adjacent lenticular lenses 136 in a second direction y between adjacent arrays 138a, 138b. The spacing 137b may range from 10 μm to about 5000 μm. It should be noted that in some embodiments, the height d2 of lenticular lenses 136 in an array 138 may gradually decrease in two dimensions (both the x and y directions) (see, e.g., FIG. 3C). Further, the slope of the end surfaces of a lenticular lens 136 may be either the same or different in the first and/or second directions. In some embodiments, the slope angle is less than 15 degrees, less than 10 degrees, less than 8 degrees, or less than 5 degrees as measured from the surface of the glass substrate 110. While the length l of lenticular lenses 136 is depicted as substantially the same in an array and between arrays, the claims appended herewith should not be so limited as the lengths l of individual lenticular lenses 136 in an array may be different (see, e.g., FIGS. 4A-4C) or the lengths l of lenticular lenses 136 between arrays may be different (e.g., the length l of a first array 138a is greater than or less than the length l of a second array 138b) (not shown). Thus, in exemplary embodiments both one dimensional and two dimensional dimming can be achieved through the combination of the aspect ratio of the lenticular lenses 136 and the spacing 137a between lenticular lenses 136 in a first direction x and the spacing 137b between lenticular lenses 136 or arrays 138 in a second direction y to achieve efficient light confinement.

Figure 4A:
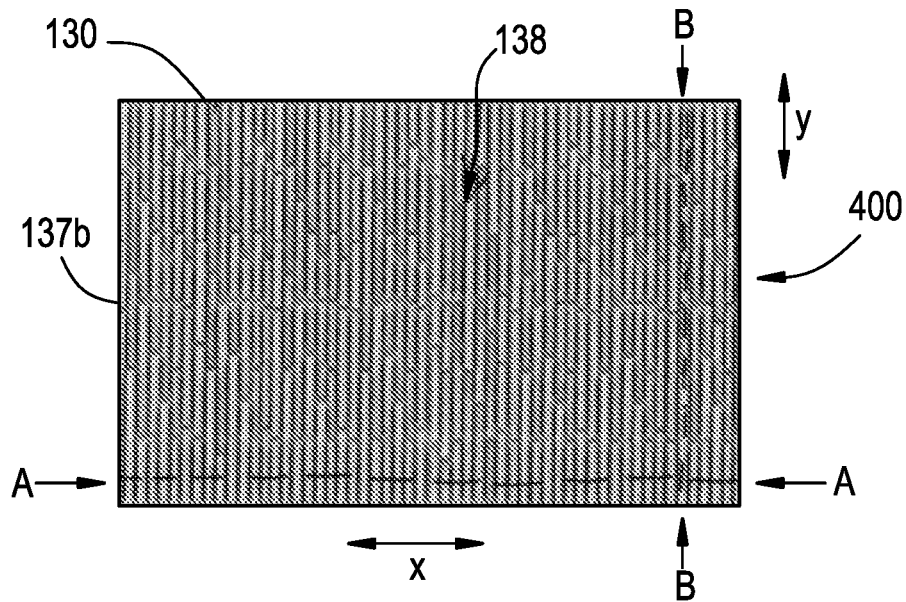
FIGS. 4A-4C illustrate exemplary microstructure arrays according to some embodiments of the disclosure.
Figure 4B:
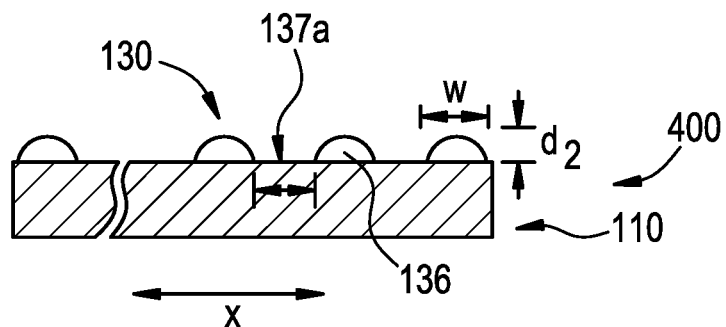
Figure 4C:
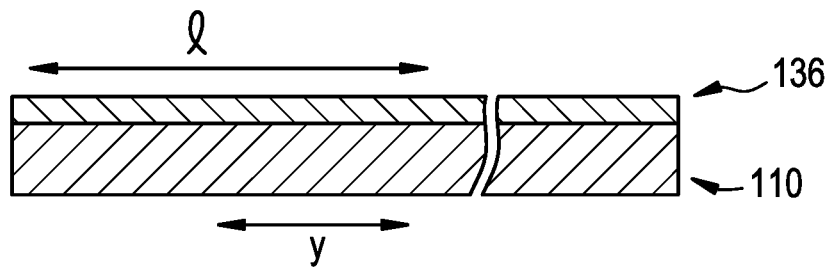

FIGS. 4A-4C illustrate exemplary embodiments of an LGP 400 comprising a glass substrate 110 and polymeric film comprising a plurality of microstructures 130. A top view of an exemplary LGP 400 is illustrated in FIG. 4A. FIG. 4B is a side view of the LGP 400 of FIG. 4A along line A-A, and FIG. 4C is a side view of the LGP 400 of FIG. 4A along line B-B. With reference to FIGS. 4A-4C, a plurality of microstructures 130 comprising lenticular lenses 136 is shown provided directly on the glass substrate 110 without a polymeric platform. Each lenticular lens 136 comprises a predetermined width w and height d2 as measured from the glass substrate 110 as well as a length l. The width w and height d2 may be the same for each lenticular lens 136 in the array 138 of lenses contained on a LGP 400 or may be different among the array 138; however and in comparison to FIGS. 3A-3C, the lenticular lenses 136 may have differing lengths l in the array 138 in a second direction y. As shown, a predetermined spacing 137a may be provided between adjacent lenticular lenses 136 in a first direction x in an array 138. This spacing 137a may be constant (periodic) between each lenticular lens 136 in the array 138 or may be discontinuous, graduated, or otherwise irregular (non-periodic) between adjacent lenticular lenses 136 in the array 138. The spacing 137a may range from 0.01*w to about 4.0*w, from 0.05*w to about 3.0*w, or from 0.1*w to about 2.0*w. A predetermined spacing 137b may also be provided between adjacent lenticular lenses 136 in a second direction y. The spacing 137b may range from 10 μm to about 5000 μm. It should be noted that in some embodiments, the height d2 of lenticular lenses 136 in the array 138 may gradually decrease in two dimensions (both the x and y directions). Further, the slope of the end surfaces of a lenticular lens 136 may be either the same or different in either and/or both the first and second directions. In some embodiments, the slope angle is less than 15 degrees, less than 10 degrees, less than 8 degrees, or less than 5 degrees as measured from the surface of the glass substrate 110. Thus, in exemplary embodiments both one dimensional and two dimensional dimming can be achieved through the combination of the aspect ratio of the lenticular lenses 136 and the spacing 137a between lenticular lenses 136 in a first direction x and the spacing 137b between and length of lenticular lenses 136 in a second direction y to achieve efficient light confinement.

With continued reference to FIGS. 2A-4C, because of the designs of the depicted, the distance of light propagating in plastics or other materials for making lenticulars can be minimized to thereby reduce the color shift introduced by plastic lenticular features. Further, reliability issues related to CTE mismatching between glass and polymeric materials for exemplary microstructures can be suppressed in such embodiments.

As used herein, the term "microstructures," "microstructured," and variations thereof is intended to refer to surface relief features of the polymeric film having at least one dimension (e.g., height, width, etc.) that is less than about 500 µm, such as less than about 400 µm, less than about 300 µm, less than about 200 µm, less than about 100 µm, less than about 50 µm, or even less, e.g., ranging from about 10 µm to about 500 µm, including all ranges and subranges therebetween. The microstructures may, in certain embodiments, have regular or irregular shapes, which can be identical or different within a given array. While FIGS. 1A-4O generally illustrate microstructures 130 of the same size and shape, which are spaced apart evenly or otherwise at substantially the same pitch, it is to be understood that not all microstructures within a given array must have the same size and/or shape and/or spacing and the claims appended herewith should not be so limited. Combinations of microstructure shapes and/or sizes may be used, and such combinations may be arranged in a periodic or non-periodic fashion.

Suitable methods for creating such microstructures can include printing, such as inkjet printing, screen printing, microprinting, microreplication, texturing, mechanical roughening, etching, injection molding, coating, laser damaging, laser bonding, laser assisted growth, flexography, or any combination thereof.

Figure 10:
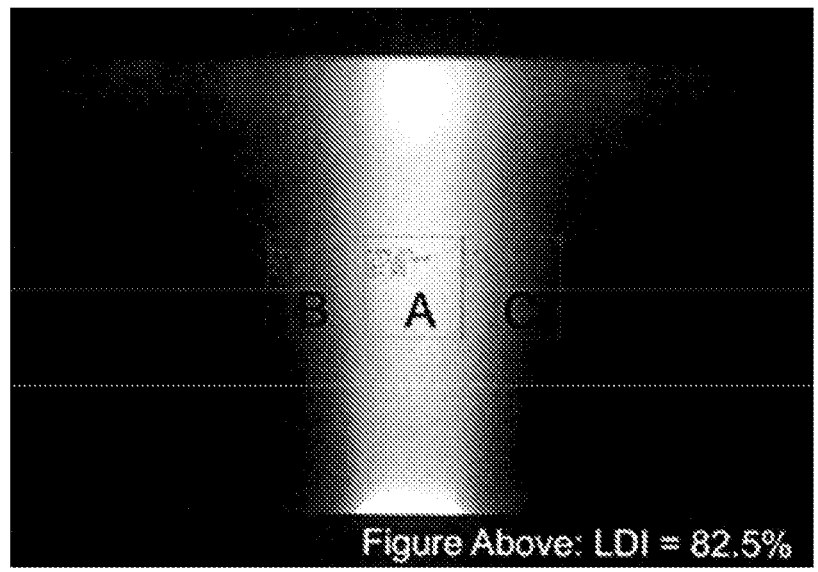
FIG. 10 is a pictorial illustration of some embodiments of the present subject matter.
Figure 11:
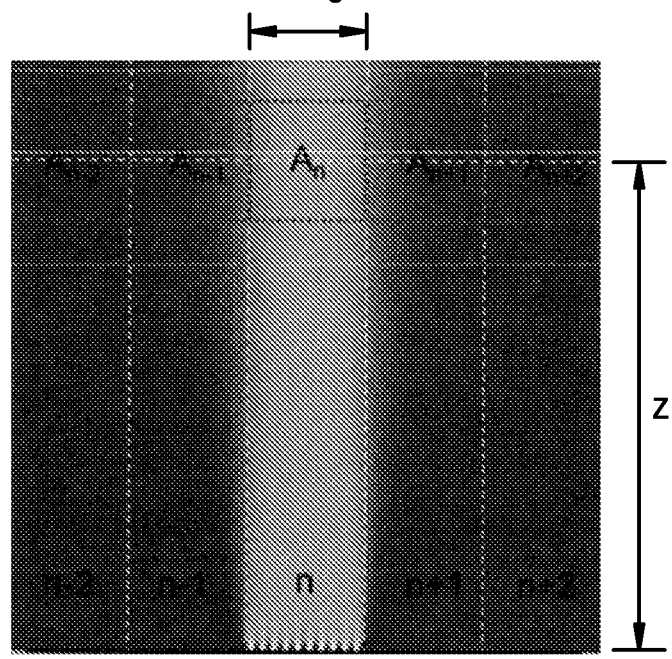
FIG. 11 is a pictorial illustration of local dimming for some embodiments of the present subject matter.

Moreover, the size and/or shape of the microstructures 130 can be varied depending on the desired light output and/or optical functionality of the LGP. For instance, different microstructure shapes may result in different local dimming efficiencies, also referred to as the local dimming index (LDI), as defined below. By way of a non-limiting example, a periodic array of prism microstructures may result in an LDI value up to about 70%, whereas a periodic array of lenticular lenses may result in an LDI greater than 70%, and even greater than about 83%. Of course, the microstructure size and/or shape and/or spacing may be varied to achieve different LDI values. Different microstructure shapes may also provide additional optical functionalities. For instance, a prism array having a 90° prism angle may not only result in more efficient local dimming, but may also partially focus the light in a direction perpendicular to the prismatic ridges due to recycling and redirecting of the light rays. FIG. 10 is a pictorial illustration of some embodiments of the present subject matter. With reference to FIG. 10, exemplary embodiments depicted in FIGS. 1A-1C were constructed having a 16 micron thick (total thickness of the microstructures and polymeric platform) and 70 micron wide microstructures which provided an LDI of greater than 80% (e.g., 82.5%) thereby illustrating that a thinner polymeric layer can function as an effective light condiment for an exemplary LGP. FIG. 11 is a pictorial illustration of local dimming for other embodiments of the present subject matter (e.g., FIGS. 2A-4C). As shown in FIG. 11, LDI and Straightness at a distance Z from LED input edge can be respectively defined as:

$$LDI = \left[1 - \frac{(L_{n+1} + L_{n-1})/2}{L_n}\right] \times 100 \quad (1)$$

$$\text{Straightness} = \frac{(L_{n-2} + L_{n+2})/2}{L_n} \times 100 \quad (2)$$

where, $L_m$ represents the luminance of the area $A_m$ of zone m (m=n−2, n−1, n, n+1, n+2) at the distance Z from an LED input edge.

Table 1 below provides exemplary, non-limiting parameters of exemplary LGPs, LEDs, and microstructures comprising lenticular lenses for one dimensional local dimming modeling conducted for the embodiments depicted in FIGS. 11, 12, 13A, and 13B. In these embodiments, it was assumed that the local dimming zone width was 100 mm and that there were ten LEDs in each zone. The size of the LGP was approximately 500 mm×500 mm.

TABLE 1

| Parameter | |
|---|---|
| LGP thickness (mm) | 1.1 |
| Index of LGP | 1.49 |
| Index of lenticular lenses | 1.49 |
| Lenticular width (mm) | 0.30 |
| Lenticular height (mm) | 0.15 |
| Local dimming zone width (mm) | 100 |
| LED number in local dimming zone | 10 |
| LED-LGP gap (mm) | 0.01 |
| LED width (mm) | 1.0 |
| LED length | 3.6 |

Figure 12:
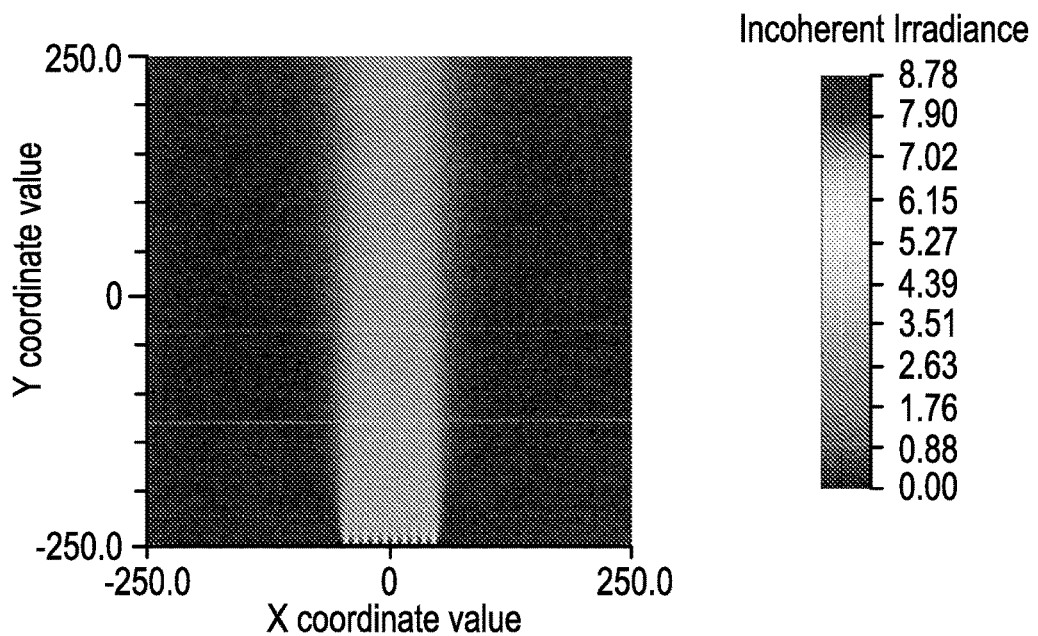
FIG. 12 is a pictorial illustration of light distribution for some embodiments of the present subject matter.

FIG. 12 is a pictorial illustration of light distribution for some embodiments of the present subject matter (e.g., FIGS. 2A-4C). With reference to FIG. 12, light distribution across an exemplary LGP is illustrated with a spacing between two lenticular lenses being 0.15 mm. It can be observed that the light from a respective light source is confined within the 100 mm width zone through input edge to output edge.

Figure 13A:
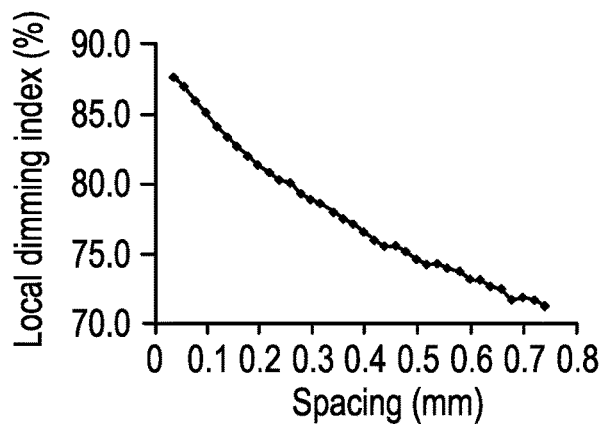
FIG. 13A is a graphical depiction of local dimming indices for some embodiments.
Figure 13B:
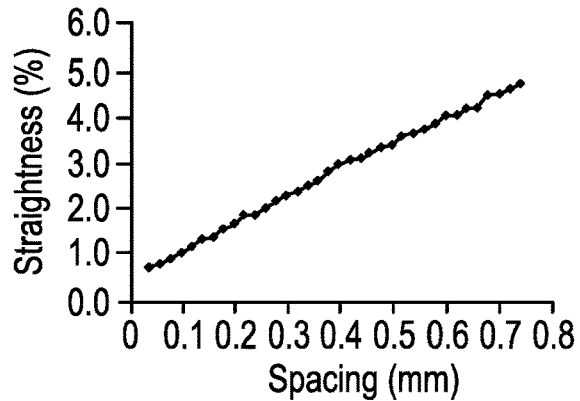
FIG. 13B is a graphical depiction of Straightness as a function of spacing between adjacent microstructures for some embodiments of the present subject matter.

FIG. 13A is a graphical depiction of local dimming indices for some embodiments (e.g., FIGS. 2A-4C), and FIG. 13B is a graphical depiction of Straightness as a function of spacing between adjacent microstructures for some embodiments of the present subject matter (e.g., FIGS. 2A-4C). With reference to FIGS. 13A and 13B, LDI and Straightness of exemplary embodiments at a 450 mm distance from an input edge is provided as a function of the spacing between two lenticular lenses, respectively. It can be observed that the LDI decreases and Straightness increases with an increase in the spacing between two lenticular lenses. It was determined that exemplary LDI values greater than 75% and Straightness values less than 3.3% can be achieved when the spacing between adjacent lenticular lenses is less than about 0.5 mm or when the spacing between adjacent lenticular lenses is less than about 1.6 times the lenticular lens width. This is an indication of good light confinement (e.g., local dimming) performance.

Figure 5A:
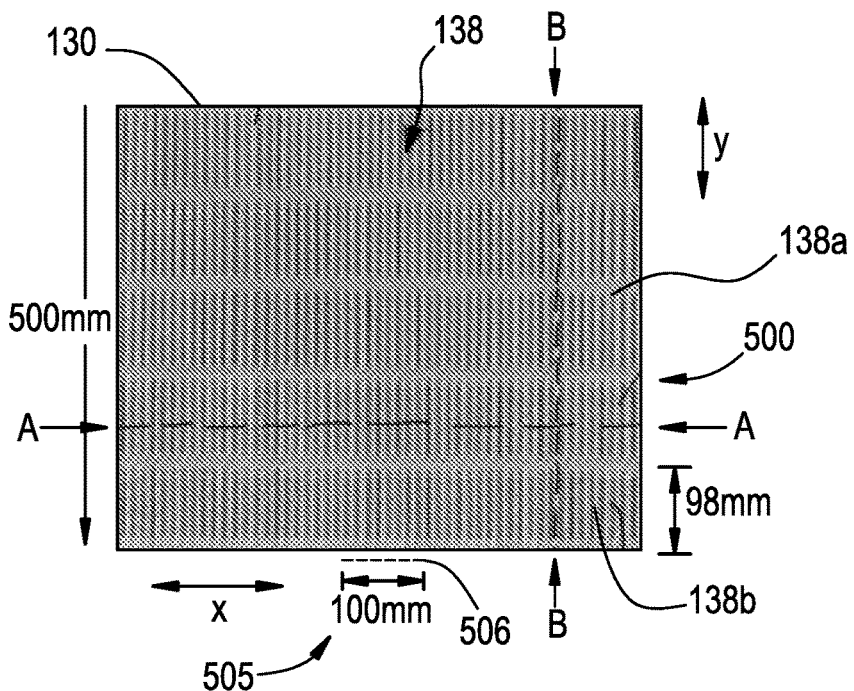
FIGS. 5A-5C illustrate exemplary microstructure arrays according to additional embodiments of the disclosure.
Figure 5B:
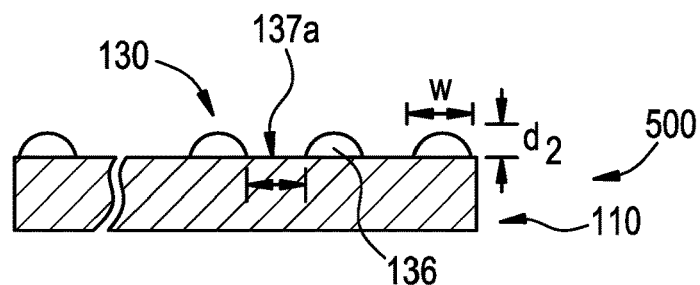
Figure 5C:
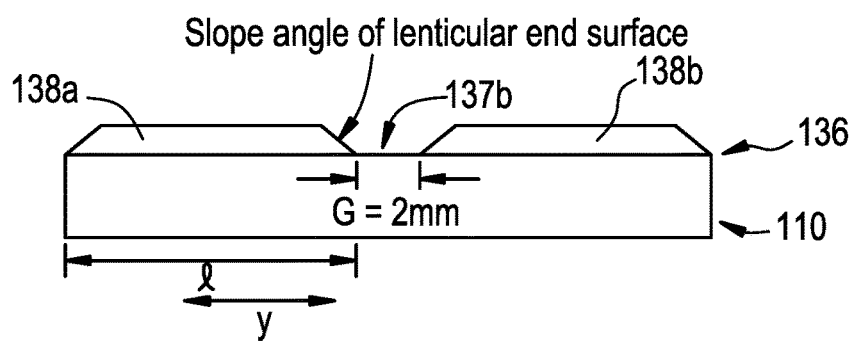

FIGS. 5A-5C illustrate exemplary embodiments of a LGP 500 comprising a glass substrate 110 and polymeric film comprising a plurality of microstructures 130. A top view of an exemplary LGP 500 is illustrated in FIG. 5A. FIG. 5B is a side view of the LGP 500 of FIG. 5A along line A-A, and FIG. 5C is a side view of the LGP 500 of FIG. 5A along line B-B. With reference to FIGS. 5A-5C, a plurality of microstructures 130 comprising lenticular lenses 136 is shown provided directly on the glass substrate 110 without a polymeric platform. Each lenticular lens 136 comprises a predetermined width w and height d2 as measured from the glass substrate 110 as well as a length l. The width w and height d2 may be the same for each lenticular lens 136 in an array 138 of lenses contained on a LGP 500 or may be different among the array 138; however, as shown the lenticular lenses 136 may each have the same length l in an array 138 and/or between each array. As shown, a predetermined spacing 137a may be provided between adjacent lenticular lenses 136 in a first direction x in an array 138. This spacing 137a may be constant (periodic) between each lenticular lens 136 in the array 138 or may be discontinuous, graduated, or otherwise irregular (non-periodic) between adjacent lenticular lenses 136 in the array 138. The spacing 137a may range from 0.01*w to about 4.0*w, from 0.05*w to about 3.0*w, or from 0.1*w to about 2.0*w. A predetermined spacing 137b may also be provided between adjacent lenticular lenses 136 in a second direction y between adjacent arrays 138a, 138b. The spacing 137b may range from 10 μm to about 5000 μm. It should be noted that in some embodiments, the height d2 of lenticular lenses 136 in an array 138 may gradually decrease in two dimensions (both the x and y directions) (see, e.g., FIG. 5C) and/or with a predetermined slope angle. Further, the slope of the end surfaces of a lenticular lens 136 may be either the same or different in the first and/or second directions. In some embodiments, the slope angle is less than 15 degrees, less than 10 degrees, less than 8 degrees, or less than 5 degrees as measured from the surface of the glass substrate 110. While the length l of lenticular lenses 136 is depicted as substantially the same in an array and between arrays, the claims appended herewith should not be so limited as the lengths l of individual lenticular lenses 136 in an array may be different (see, e.g., FIGS. 4A-4C) or the lengths l of lenticular lenses 136 between arrays may be different (e.g., the length l of a first array 138a is greater than or less than the length l of a second array 138b) (not shown). Thus, in exemplary embodiments both one dimensional and two dimensional dimming can be achieved through the combination of the aspect ratio of the lenticular lenses 136 and the spacing 137a between lenticular lenses 136 in a first direction x and the spacing 137b between lenticular lenses 136 or arrays 138 in a second direction y to achieve efficient light confinement.

With continued reference to FIGS. 5A-5C, the depicted, non-limiting embodiment provides a local dimming zone width 505 of 100 mm with are ten LEDs 506 in each zone. The size of the LGP 500 in this non-limiting embodiment is 500 mm×500 mm. The length of each lenticular lens 136 in each array 138 is 98 mm. In this depicted, non-limiting embodiment there are five cascaded lenticular lenses 136 (e.g., five arrays 138) along the light propagating direction (y direction) and the spacing 137b between these lenticular lenses 136 or arrays 138 is 2 mm. Table 2 below provides exemplary, non-limiting parameters of exemplary LGPs, LEDs, and microstructures comprising lenticular lenses for two dimensional local dimming modeling conducted for the embodiments depicted in FIGS. 5A-5C, 14A, 14B, and 15.

TABLE 2

| Parameter | |
|---|---|
| LGP thickness (mm) | 1.1 |
| Index of LGP | 1.49 |
| Index of lenticular lenses | 1.49 |
| Lenticular width (mm) | 0.30 |
| Lenticular height (mm) | 0.15 |
| Spacing between lenticulars (x-direction) (mm) | 0.15 |
| Spacing between lenticulars (y-direction) (mm) | 2.0 |
| Local dimming zone width (mm) | 100 |
| LED number in local dimming zone | 10 |
| LED-LGP gap (mm) | 0.01 |
| LED width (mm) | 1.0 |
| LED length | 3.6 |

Figure 14A:
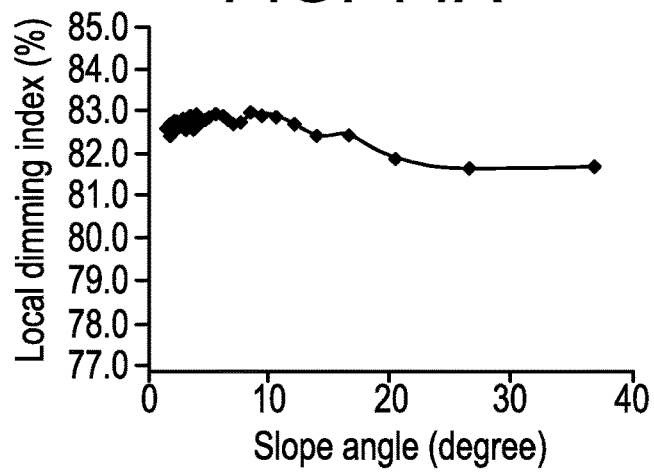
FIG. 14A is a graphical depiction of local dimming indices for some embodiments.
Figure 14B:
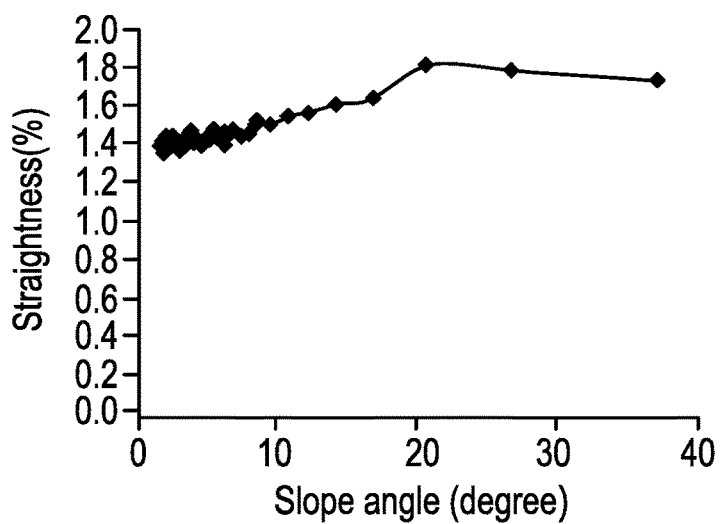
FIG. 14B is a graphical depiction of Straightness as a function of the slope angle of the end surface of discontinuous microstructures for some embodiments of the present subject matter.

FIG. 14A is a graphical depiction of local dimming indices for some embodiments (e.g., FIGS. 5A-5C), and FIG. 14B is a graphical depiction of Straightness as a function of the slope angle of the end surface of discontinuous microstructures for some embodiments (e.g., FIGS. 5A-5C). With reference to FIGS. 14A and 14B, LDI and Straightness of exemplary embodiments at a 450 mm distance from an input edge is provided as a function of the slope angle of the end surface of discontinuous lenticular lenses. It can be observed that exemplary LDI values greater than 80% and Straightness values less than 1.8% can be achieved when the slope angle of the end surface of the discontinuous lenticular lenses is less than about 20 degrees. This is an indication of good light confinement (e.g., local dimming) performance.

Figure 15:
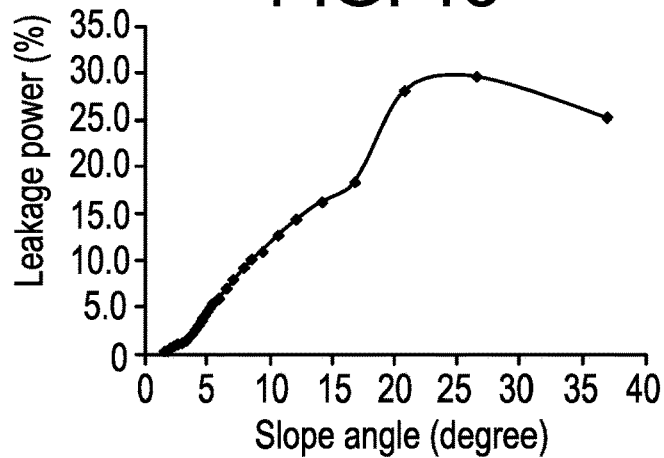
FIG. 15 is a graphical depiction of leakage power as a function of the slope angle of the end surface of discontinuous microstructures for some embodiments of the present subject matter.

FIG. 15 is a graphical depiction of leakage power as a function of the slope angle of the end surface of discontinuous microstructures for some embodiments. With reference to FIG. 15, the percentage of the leakage of light power due to the end surfaces of lenticular lenses to total power coupled into the LGP as a function of the slope angle of the end surface of discontinuous lenticular lenses can be observed. For example, it can be observed that leakage light power decreases with a decreasing slope angle of the end surface of discontinuous lenticular lenses. Thus, in some embodiments, the leakage light power can be less than 5% of the total power coupled into the LGP when the slope angle is less than about 5 degrees.

Figure 6:
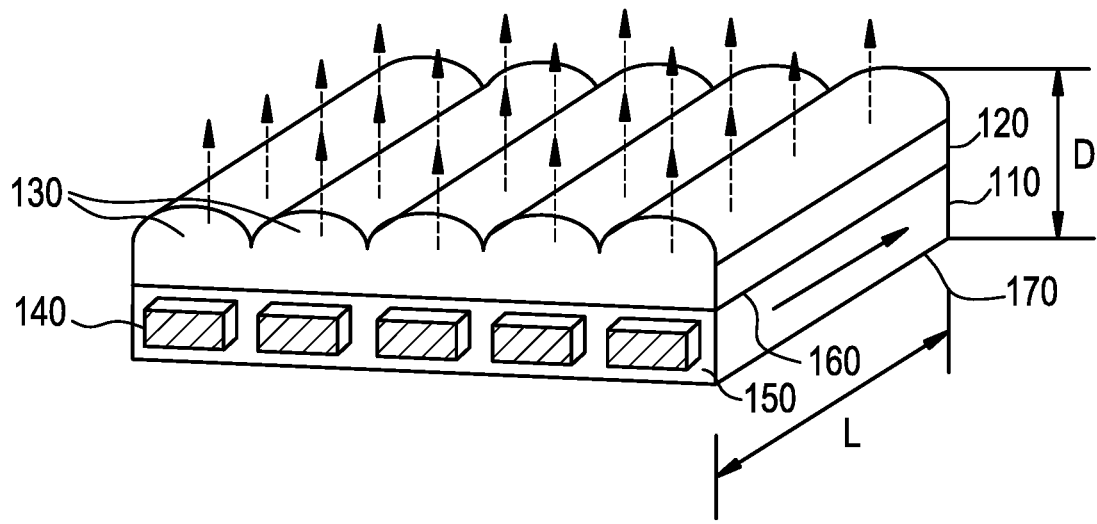
FIG. 6 illustrates a light guide assembly according to certain embodiments of the disclosure.

FIG. 6 illustrates a light guide assembly according to certain embodiments of the disclosure. With reference to FIG. 6, at least one light source 140 can be optically coupled to an edge surface 150 of the glass substrate 110 in embodiments described herein, e.g., positioned adjacent to the edge surface 150. The term "optically coupled" is intended to denote that a light source is positioned at an edge of the LGP so as to introduce light into the LGP. A light source may be optically coupled to the LGP even though it is not in physical contact with the LGP. Additional light sources (not illustrated) may also be optically coupled to other edge surfaces of the LGP, such as adjacent or opposing edge surfaces.

A general direction of light emission from light source 140 is depicted in FIG. 6 by the solid arrow. Light injected into the LGP may propagate along a length L of the LGP due to total internal reflection (TIR), until it strikes an interface at an angle of incidence that is less than the critical angle. Total internal reflection (TIR) is the phenomenon by which light propagating in a first material (e.g., glass, plastic, etc.) comprising a first refractive index can be totally reflected at the interface with a second material (e.g., air, etc.) comprising a second refractive index lower than the first refractive index. TIR can be explained using Snell's law:

$$n_1 \sin(\theta_1) = n_2 \sin(\theta_r)$$

which describes the refraction of light at an interface between two materials of differing indices of refraction. In accordance with Snell's law, $n_1$ is the refractive index of a first material, $n_2$ is the refractive index of a second material, $\theta_i$ is the angle of the light incident at the interface relative to a normal to the interface (incident angle), and $\theta_r$ is the angle of refraction of the refracted light relative to the normal. When the angle of refraction ($\theta_r$) is 90°, e.g., $\sin(\theta_r)=1$, Snell's law can be expressed as:

$$\theta_c = \theta_i = \sin^{-1}\left(\frac{n_2}{n_1}\right)$$

The incident angle $\theta_i$ under these conditions may also be referred to as the critical angle $\theta^c$. Light having an incident angle equal to or greater than the critical angle ($\theta_i > \theta_c$) will be totally internally reflected within the first material, whereas light with an incident angle less than the critical angle ($\theta_i \leq \theta_c$) will be transmitted by the first material. In the case of an exemplary interface between air ($n_1=1$) and glass ($n_2=1.5$), the critical angle ($\theta_c$) can be calculated as 41°. Thus, if light propagating in the glass strikes the air-glass interface at an incident angle greater than 41°, all the incident light will be reflected from the interface at an angle equal to the incident angle. If the reflected light encounters a second interface comprising an identical refractive index relationship as the first interface, the light incident on the second interface will again be reflected at a reflection angle equal to the incident angle.

With continued reference to FIGS. 1A-50, polymeric film with or without a polymeric platform 120 may be disposed on a major surface of the glass substrate 110, such as light emitting surface 160. The array of microstructures 130 may, along with other optional components of the LGP, direct the transmission of light in a forward direction (e.g., toward a user), as indicated by the dashed arrows. In some embodiments, light source 140 may be a Lambertian light source, such as a light emitting diode (LED). Light from the LEDs may spread quickly within the LGP, which can make it challenging to effect local dimming (e.g., by turning off one or more LEDs). However, by providing one or more microstructures on a surface of the LGP that are elongated in the direction of light propagation (as indicated by the solid arrow in FIG. 6), it may be possible to limit the spreading of light such that each LED source effectively illuminates only a narrow strip of the LGP. The illuminated strip may extend, for example, from the point of origin at the LED to a similar end point on the opposing edge. As such, using various microstructure configurations, it may be possible to effect 1D or 2D local dimming of at least a portion of the LGP in a relatively efficient manner. Of course, as depicted in FIGS. 2A-5C, exemplary embodiments may omit the polymeric platform 120.

In alternative embodiments, the light guide assembly can be configured such that it is possible to achieve 2D local dimming by optically coupling additional light sources to an adjacent (e.g., orthogonal) edge surface. A first polymeric film may be arranged on the light emitting surface having microstructures extending in a propagation direction, and a second polymeric film may be arranged on the opposing major surface, this film having microstructures extending in a direction orthogonal to the propagation direction. Thus, 2D local dimming may be achieved by selectively shutting off one or more of the light sources along each edge surface in such alternative embodiments. In other embodiments, the light guide assembly can be configured such that it is possible to achieve 2D local dimming by stacking two light guide plates with the orientation being orthogonal between the microstructures on the two light guide plates. For example, a first polymeric film may be arranged on the light emitting surface of one light guide plate having microstructures extending in a propagation direction, and a second polymeric film may be arranged on the light emitting surface of the other light guide plate, this film having microstructures extending in a direction orthogonal to the propagation direction. Thus, 2D local dimming may be achieved by selectively shutting off one or more of the light sources along each edge surface in such alternative embodiments.

According to further embodiments, the second major surface 170 of the glass substrate 110 may be patterned with a plurality of light extraction features. As used herein, the term "patterned" is intended to denote that the plurality of light extraction features is present on or in the surface of the substrate in any given pattern or design, which may, for example, be random or arranged, repetitive or non-repetitive, uniform or non-uniform. In other embodiments, the light extraction features may be located within the matrix of the glass substrate adjacent the surface, e.g., below the surface. For instance, the light extraction features may be distributed across the surface, e.g. as textural features making up a roughened or raised surface, or may be distributed within and throughout the substrate or portions thereof, e.g., as laser-damaged features. Suitable methods for creating such light extraction features can include printing, such as inkjet printing, screen printing, microprinting, microreplication, and the like, texturing, mechanical roughening, etching, injection molding, coating, laser damaging, or any combination thereof. Non-limiting examples of such methods include, for instance, acid etching a surface, coating a surface with $TiO_2$, and laser damaging the substrate by focusing a laser on a surface or within the substrate matrix. Another exemplary method which creates such light extraction features can also microreplicate, microprint, or otherwise deposit exemplary features and then engrave additional features thereon using a laser. For example, in such methods one can control the depth of focus of a laser engraving system to achieve light extraction features according to embodiments described herein. Further, in the case of continuous output (CW) laser engraving, continuous light extraction features and spacing across the backlight can be achieved by programming the translation stages or galvano-mirrors, and the width of the features may be varied by using a zoom optics for the laser beam. In some embodiments, it might also be necessary to vary the light extraction features density in the direction perpendicular to the one of light propagation. This can be performed by operating the laser in a quasi-CW (long pulses) regime rather than CW.

In various embodiments, the light extraction features optionally present on the first or second surface of the LGP may comprise light scattering sites. According to various embodiments, the extraction features may be patterned in a suitable density so as to produce substantially uniform light output intensity across the light emitting surface of the glass substrate. In certain embodiments, a density of the light extraction features proximate the light source may be lower than a density of the light extraction features at a point further removed from the light source, or vice versa, such as a gradient from one end to another, as appropriate to create the desired light output distribution across the LGP.

The LGP may be treated to create light extraction features according to any method known in the art, e.g., the methods disclosed in co-pending and co-owned International Patent Application Nos. PCT/US2013/063622 and PCT/US2014/070771, each incorporated herein by reference in their entirety. For example, a surface of the LGP may be ground and/or polished to achieve the desired thickness and/or surface quality. The surface may then be optionally cleaned and/or the surface to be etched may be subjected to a process for removing contamination, such as exposing the surface to ozone. The surface to be etched may, by way of a non-limiting embodiment, be exposed to an acid bath, e.g., a mixture of glacial acetic acid (GAA) and ammonium fluoride ($NH_4F$) in a ratio, e.g., ranging from about 1:1 to about 9:1. The etching time may range, for example, from about 30 seconds to about 15 minutes, and the etching may take place at room temperature or at elevated temperature. Process parameters such as acid concentration/ratio, temperature, and/or time may affect the size, shape, and distribution of the resulting extraction features. It is within the ability of one skilled in the art to vary these parameters to achieve the desired surface extraction features.

The glass substrate 110 can have any desired size and/or shape as appropriate to produce a desired light distribution. The glass substrate 110 may comprise a second major surface 170 opposite the light emitting surface 160. The major surfaces may, in certain embodiments, be planar or substantially planar, e.g., substantially flat and/or level. The first and second major surfaces may, in various embodiments, be parallel or substantially parallel. With continued reference to FIG. 6, the glass substrate 110 may comprise four edges, or may comprise more than four edges, e.g. a multi-sided polygon. In other embodiments, the glass substrate 110 may comprise less than four edges, e.g., a triangle. By way of a non-limiting example, the light guide may comprise a rectangular, square, or rhomboid sheet having four edges, although other shapes and configurations are intended to fall within the scope of the disclosure including those having one or more curvilinear portions or edges.

In certain embodiments, the glass substrate 110 may have a thickness $d_1$ of less than or equal to about 3 mm, for example, ranging from about 0.1 mm to about 2.5 mm, from about 0.3 mm to about 2 mm, from about 0.5 mm to about 1.5 mm, or from about 0.7 mm to about 1 mm, including all ranges and subranges therebetween. The glass substrate 110 can comprise any material known in the art for use in display devices. For example, the glass substrate may comprise aluminosilicate, alkali-aluminosilicate, borosilicate, alkali-borosilicate, aluminoborosilicate, alkali-aluminoborosilicate, soda lime, or other suitable glasses. Non-limiting examples of commercially available glasses suitable for use as a glass light guide include, for instance, EAGLE XG®, Lotus™, Willow®, Iris™, and Gorilla® glasses from Corning Incorporated.

Some non-limiting glass compositions can include between about 50 mol % to about 90 mol % $SiO_2$, between 0 mol % to about 20 mol % $Al_2O_3$, between 0 mol % to about 20 mol % $B_2O_3$, and between 0 mol % to about 25 mol % $R_xO$, wherein R is any one or more of Li, Na, K, Rb, Cs and x is 2, or Zn, Mg, Ca, Sr or Ba and x is 1. In some embodiments, $R_xO—Al_2O_3>0$; $0<R_xO—Al_2O_3<15$; $x=2$ and $R_2O—Al_2O_3<15$; $R_2O—Al_2O_3<2$; $x=2$ and $R_2O—Al_2O_3—MgO>-15$; $0<(R_xO—Al_2O_3)<25$, $-11<(R_2O—Al_2O_3)<11$, and $-15<(R_2O—Al_2O_3—MgO)<11$; and/or $-1<(R_2O—Al_2O_3)<2$ and $-6<(R_2O—Al_2O_3—MgO)<1$. In some embodiments, the glass comprises less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+35Ni<about 40 ppm, Fe+30Cr+35Ni<about 20 ppm, or Fe+30Cr+35Ni<about 10 ppm. In other embodiments, the glass comprises between about 60 mol % to about 80 mol % $SiO_2$, between about 0.1 mol % to about 15 mol % $Al_2O_3$, 0 mol % to about 12 mol % $B_2O_3$, and about 0.1 mol % to about 15 mol % $R_2O$ and about 0.1 mol % to about 15 mol % RO, wherein R is any one or more of Li, Na, K, Rb, Cs and x is 2, or Zn, Mg, Ca, Sr or Ba and x is 1.

In other embodiments, the glass composition can comprise between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$.

In additional embodiments, the glass substrate 110 can comprise an $R_xO/Al_2O_3$ ratio between 0.95 and 3.23, wherein R is any one or more of Li, Na, K, Rb, Cs and x is 2. In further embodiments, the glass substrate may comprise an $R_xO/Al_2O_3$ ratio between 1.18 and 5.68, wherein R is any one or more of Li, Na, K, Rb, Cs and x is 2, or Zn, Mg, Ca, Sr or Ba and x is 1. In yet further embodiments, the glass substrate can comprise an $R_xO—Al_2O_3—MgO$ between -4.25 and 4.0, wherein R is any one or more of Li, Na, K, Rb, Cs and x is 2. In still further embodiments, the glass substrate may comprise between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$.

In additional embodiments, the glass substrate 110 can comprise between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In certain embodiments, the glass substrate can comprise between about 60 mol % to about 80 mol % $SiO_2$, between about 0 mol % to about 15 mol % $Al_2O_3$, between about 0 mol % to about 15 mol % $B_2O_3$, and 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm. In some embodiments, an exemplary transparent glass or polymeric material can comprise less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+

35Ni<about 40 ppm, Fe+30Cr+35Ni<about 20 ppm, or Fe+30Cr+35Ni<about 10 ppm.

In some embodiments, the glass substrate 110 can comprise a color shift $\Delta y$ less than 0.015, such as ranging from about 0.005 to about 0.015 (e.g., about 0.005, 0.006, 0.007, 0.008, 0.009, 0.010, 0.011, 0.012, 0.013, 0.014, or 0.015). In other embodiments, the glass substrate can comprise a color shift less than 0.008. Color shift may be characterized by measuring variation in the x and y chromaticity coordinates along the length L using the CIE 1931 standard for color measurements. For glass light-guide plates the color shift $\Delta y$ can be reported as $\Delta y = y(L_2) - y(L_1)$ where $L_2$ and $L_1$ are Z positions along the panel or substrate direction away from the source launch and where $L_2 - L_1 = 0.5$ meters. And this is the manner in which color shift values reported herein were determined. Exemplary light-guide plates have $\Delta y < 0.01$, $\Delta y < 0.005$, $\Delta y < 0.003$, or $\Delta y < 0.001$. According to certain embodiments, the glass substrate can have a light attenuation $\alpha_1$ (e.g., due to absorption and/or scattering losses) of less than about 4 dB/m, such as less than about 3 dB/m, less than about 2 dB/m, less than about 1 dB/m, less than about 0.5 dB/m, less than about 0.2 dB/m, or even less, e.g., ranging from about 0.2 dB/m to about 4 dB/m, for wavelengths ranging from about 420-750 nm.

The glass substrate 110 may, in some embodiments, be chemically strengthened, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

With continued reference to FIGS. 1A-5C, the polymeric film and/or polymeric platform 120, if used, can comprise any polymeric material capable of being UV or thermally cured. The polymeric material may further be chosen from compositions having a low color shift and/or low absorption of blue light wavelengths (e.g., ~450-500 nm), as discussed in more detail below. In certain embodiments, the polymeric film 120 may be thinly deposited on the light emitting surface of the glass substrate. The polymeric film 120 may be continuous or discontinuous.

The polymeric film and/or polymeric platform 120, if used, may have an overall thickness $d_2$ and a platform thickness t. In certain embodiments, the microstructures 130 may comprise peaks p and valleys v, and the overall thickness may correspond to the height of the peaks p, whereas the platform thickness may correspond to the height of the valleys v. According to various embodiments, it may be advantageous to deposit the polymeric film such that the platform thickness t is zero or as close to zero as possible. When t is zero, the polymeric film may be discontinuous. For instance, the platform thickness t may range from 0 to about 250 µm, such as from about 10 µm to about 200 µm, from about 20 µm to about 150 µm, or from about 50 µm to about 100 µm, including all ranges and subranges therebetween. It was discovered that in some embodiments, the platform thickness t should not exceed 15 microns to reduce potential color shift imparted by the polymeric film. In additional embodiments, the overall thickness $d_2$ may range from about 10 µm to about 500 µm, such as from about 20 µm to about 400 µm, from about 30 µm to about 300 µm, from about 40 µm to about 200 µm, or from about 50 µm to about 100 µm, including all ranges and subranges therebetween. It was also discovered that in some embodiments, the overall thickness $d_2$ should not exceed 25 microns in total to also reduce any potential color shift imparted by the polymeric material. In such embodiments, it was discovered that by restricting the overall thickness $d_2$ to be as thin as possible, one can reduce and minimize the warping and delamination issues due to any CTE mismatch between the glass and the polymeric material. Additionally, if strain is inherited due to moisture absorption of the polymeric material the net effect on the final product will be minimized by using the minimal amount of polymeric material. Furthermore, it was discovered that conventional polymeric material utilized for such structures usually have a higher level of absorption at the visible wavelengths (especially an effect known as yellowing) and using a minimal amount of polymeric material can result in achieving the lowest color shift while obtaining light collimation characteristics. Table 3 below provides data illustrating an increase in color shift $\Delta y$ with increasing platform thickness t.

TABLE 3

| Case | Platform thickness | $\Delta x$, 9 point | $\Delta y$, 9 point | Lum Unif., 9 point |
|---|---|---|---|---|
| 1 | 1 µm | 0.0159 | 0.0213 | 91.5% |
| 2 | 2 µm | 0.0179 | 0.0246 | 91.9% |
| 3 | 3 µm | 0.0180 | 0.0251 | 91.2% |
| 4 | 5 µm | 0.0185 | 0.0270 | 90.9% |

With reference to the values in Table 3 above, one can observe that increasing the polymeric material thickness results in an increase in the color shift $\Delta y$. A final advantage to embodiments described herein relates to a reduced price in the final product. That is, by keeping the overall thickness $d_2$ and/or platform thickness t to as low as reasonably achievable, the cost of the final product will be reduced, and the weight of the respective light guide plate with lenticular features will be reduced or minimized which will benefit the designs for ultra-slim and low weight display devices.

Figure 7:
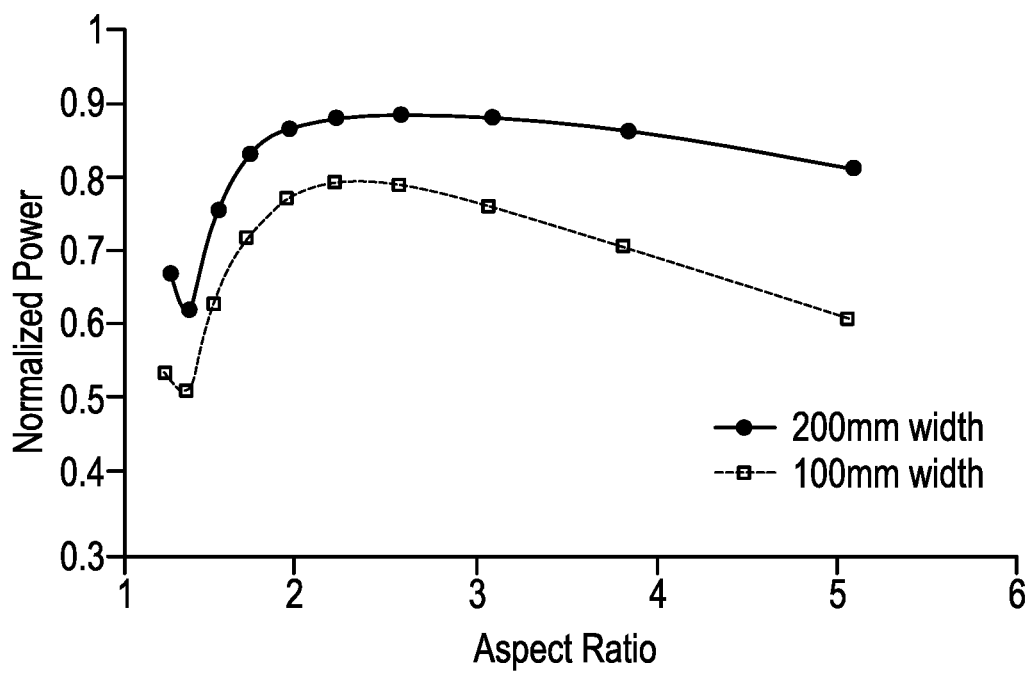
FIG. 7 is a graphical depiction of light confinement as a function of microstructure aspect ratio for a 1D local dimming configuration using a light guide plate having a microstructured surface comprising an array of lenticular lenses.

With continued reference to FIGS. 1A-5O, the microstructures 130 may also have a width w, which can be varied as desired to achieve a desired light output. For instance, FIG. 7 illustrates the effect of aspect ratio $(w/[d_2-t])$ on light confinement for a 1D dimming configuration. Normalized power is plotted to represent the ability to efficiently confine light in a given width zone.

Accordingly, in some embodiments, the width w and/or overall thickness $d_2$ may be varied to obtain a desired aspect ratio. Variation of the platform thickness t can also be used to modify the light output in some embodiments. In non-limiting embodiments, the aspect ratio of the microstructures 130 can range from about 0.1 to about 8, such as from about 0.5 to about 7, from about 1 to about 6, from about 1.5 to about 5, from about 2 to about 4, from about 2 to about 5, or from about 1.5 to about 2, including all ranges and subranges therebetween. According to some embodiments, the aspect ratio can range from about 2 to about 3, e.g., about 2, 2.1, 2.2, 2.3, 2.4, 2.5, 2.6, 2.7, 2.8, 2.9, or 3, including all ranges and subranges therebetween. The width w of the microstructures can also range, for example, from about 1 µm to about 250 µm, such as from about 10 µm to about 500 µm, from about 20 µm to about 150 µm, or from about 50 µm to about 100 µm, including all ranges and subranges therebetween. In some embodiments, the width of the microstructures can be selected based upon the height and aspect ratio of choice. The height $[d_2]$ or $[d_2-t]$, as the case may be, of the microstructures 130 can also range, for example, from about 1 µm to about 250 µm, such as from about 10 µm to about 200 µm, from about 20 µm to about 150 µm, or from about 50 µm to about 100 µm, including all ranges and subranges therebetween. In some embodiments, it was determined that the height of the microstructures should not exceed 20 µm. It should also be noted that the microstructures 130 may have a length (not labeled) extending in the direction of light propagation (see solid arrow in FIG. 6), which can vary as desired, e.g., depending on the length L of the glass substrate.

The inventors discovered that exemplary polymeric material thickness is important for several reasons. The first reason is reliability from a mechanical stability perspective. As one utilizes polymeric materials having a different CTE than the base glass which has potential to absorb more moisture, the material can expand or contract more (depending on heating or cooling) than the base glass. If this material layer is thick, the partition of load can be such that the expansion or shrinking in the resin can warp the base glass and the whole LGP. The inventors thus observed that exemplary devices can have an even greater curvature with a larger diagonal size (e.g., greater than 55") with thicker films. A second reason relates to color shift. For example, it was observed by the inventors (see Table 3) than an increase in the y component increases with a thickness of the polymeric material. Thus, the greater amount of polymeric material, the greater the absorption and color shift. Finally, additional polymeric material can add cost to the final device.

The polymeric film and/or platform may, in certain embodiments, comprise a material that does not exhibit a noticeable color shift. Several plastics and resins may have a tendency to develop a yellow tint over time due to light absorption of blue wavelengths (e.g., ~450-500 nm). This discoloration may worsen at elevated temperatures, for instance, within normal BLU operating temperatures. Moreover, BLUs incorporating LED light sources may exacerbate the color shift due to significant emission of blue wavelengths. In particular, LEDs may be used to deliver white light by coating a blue-emitting LED with a color converting material (such as phosphors, etc.) that converts some of the blue light to red and green wavelengths, resulting in the overall perception of white light. However, despite this color conversion, the LED emission spectrum may still have a strong emission peak in the blue region. If the polymeric film and/or platform absorb the blue light, it may be converted to heat, thereby further accelerating polymer degradation and further increasing blue light absorption over time.

While absorption of blue light by the polymeric film may be negligible when light propagates perpendicular to the film, it may become more significant when light propagates along the length of the film (as in the case of an edge-lit LGP), due to the longer propagation length. Blue light absorption along the length of the LGP may result in a noticeable loss of blue light intensity and, thus, a noticeable change of color (e.g., a yellow color shift) along the propagation direction. As such, a color shift may be perceived by the human eye from one edge of the display to the other. It may therefore be advantageous to select a polymeric film material that have comparable absorption values for different wavelengths within the visible range (e.g., ~420-750 nm). For instance, the absorption at blue wavelengths may be substantially similar to the absorption at red wavelengths, and so forth.

Figure 8:
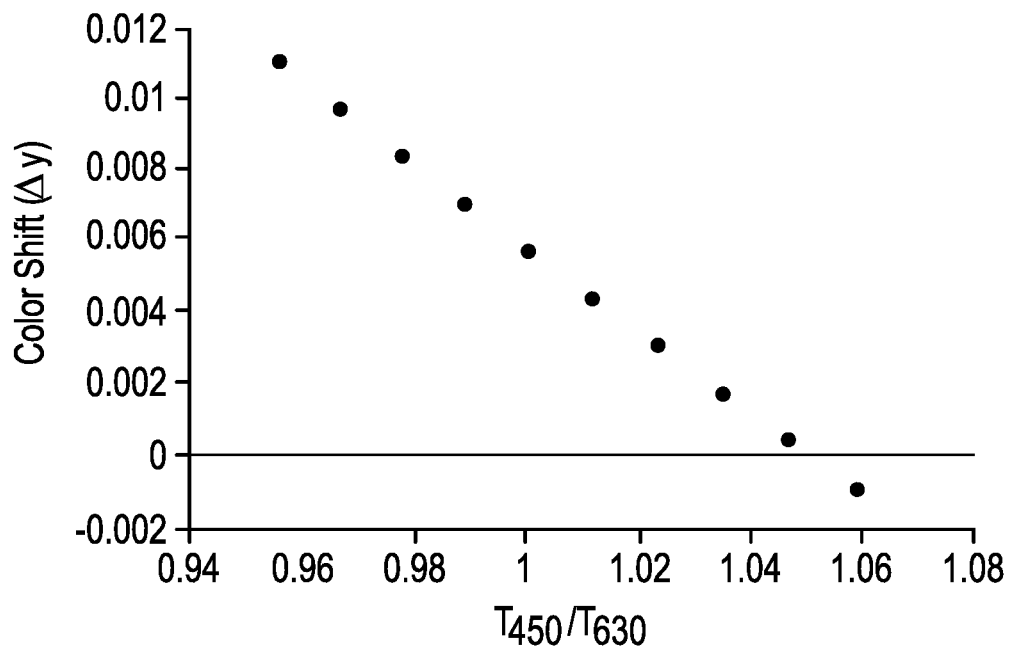
FIG. 8 is a graphical depiction of color shift Δy as a function of the ratio of blue to red transmission for a light guide plate.
Figure 9:
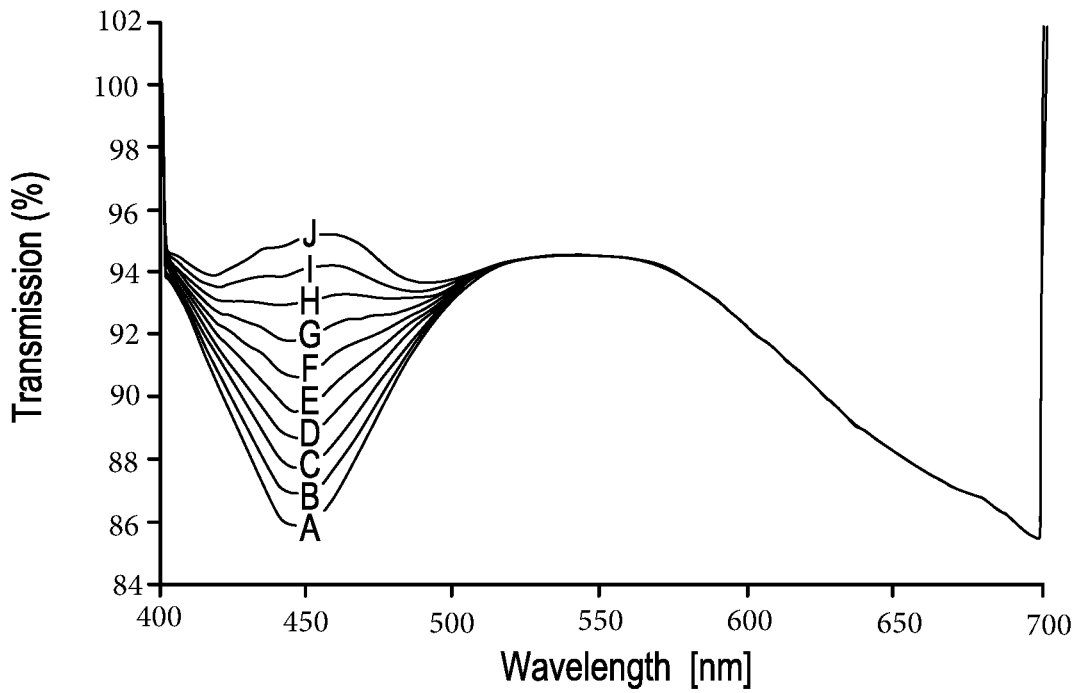
FIG. 9 is a graphical depiction of transmission curves for various light guide plates.

FIG. 8 demonstrates the impact of the blue/red transmission ratio on color shift for an LGP. As demonstrated by the plot, color shift Δy increases in a nearly linear fashion as blue (450 nm) transmission decreases relative to red (630 nm) transmission. As blue transmission approaches a value similar to that of red transmission (e.g., as the ratio approaches 1), the color shift Δy similarly approaches 0. FIG. 9 illustrates the transmission spectra used to produce the correlation presented in FIG. 8. Table 4 below provides relevant details for transmission curves A-J.

TABLE 4

Transmission Curves

| | Absorption Peak Shift (ΔA) | Color Shift (Δy) |
|---|---|---|
| A | 0.5 | 0.0111 |
| B | 0.4 | 0.0098 |
| C | 0.3 | 0.0084 |
| D | 0.2 | 0.0071 |
| E | 0.1 | 0.0057 |
| F | 0.0 | 0.0044 |
| G | −0.1 | 0.003 |
| H | −0.2 | 0.0017 |
| I | −0.3 | 0.0003 |
| J | −0.4 | −0.001 |

Because the polymeric film and/or platform may comprise only a small portion of the overall thickness of the LGP, the blue/red transmission ratio can be somewhat lower than that show in FIG. 8 (due to the relative thinness of the film) without dramatically impacting color shift performance of the overall LGP. However, it may still be desirable to reduce absorption of blue light and/or to provide a more homogenous absorption profile across the visible wavelength spectrum. For instance, the polymeric film and/or platform may be selected to avoid chromophores that absorb at wavelengths >450 nm. In certain embodiments, the polymeric film and/or platform may be chosen such that the concentration of blue light absorbing chromophores is less than about 5 ppm, such as less than about 1 ppm, less than about 0.5 ppm, or less than about 0.1 ppm, including all ranges and subranges therebetween. Alternatively, the polymeric film and/or platform may be modified to compensate for blue light absorption, e.g. by incorporating one or more dyes, pigments, and/or optical brighteners that absorb at yellow wavelengths (e.g., ~570-590 nm) to neutralize any potential color shift. However, engineering the polymeric material to absorb both at blue and yellow wavelengths may lower the overall transmissivity of the film and, thus, the overall transmissivity of the LGP. As such, in certain embodiments, it may be advantageous to instead select and/or modify a polymeric material to reduce blue light absorption and thereby increase the overall transmissivity of the film.

According to various embodiments, the polymeric film and/or platform may also be chosen to have a refractive index dispersion that balances interfacial Fresnel reflections in the blue and red spectral regions to minimize color shift along the length of the LGP. For example, the difference in Fresnel reflections at the substrate-polymeric film interface at 45° for wavelengths between about 450-630 nm may be less than 0.015%, such as less than 0.005%, or less than 0.001%, including all ranges and subranges therebetween. Other relevant dispersion characteristics are described in U.S. Provisional Application No. 62/348,465, filed Jun. 10, 2016, and entitled "Glass articles comprising light extraction features," which is incorporated herein by reference in its entirety.

Referring again to FIG. 6, in various embodiments, the polymeric film and/or platform 120 may be provided on the light emitting surface 160 of the glass substrate 110. For instance, during and/or after coating the glass substrate with the polymeric material, the polymeric material may be imprinted or embossed with a desired surface pattern. This process may be referred to as "microreplication," in which a desired pattern is first manufactured as a mold and then pressed into the polymeric material to yield a negative replica of the mold shape. The polymeric material may be UV cured or thermally cured (e.g., IR dried, etc.) during or after imprinting, which may be referred to as "UV embossing" and "thermal embossing," respectively. Alternatively, the polymeric film may be applied using hot embossing techniques, in which the polymeric material is first heated to a temperature above its glass transition point, followed by imprinting and cooling. Other methods may include printing (e.g., screen printing, inkjet printing, microprinting, etc.) or extruding a layer of polymeric material onto the glass substrate and subsequently shaping (e.g., molding, embossing, imprinting, etc.) the layer to the desired shape.

According to various embodiments, the glass substrate may comprise compositions having a first glass transition temperature $T_{g1}$ that is greater than a second glass transition temperature $T_{g2}$ of the polymeric film. For instance, a difference between the glass transition temperatures ($T_{g1}$-$T_{g2}$) may be at least about 100° C., such as ranging from about 100° C. to about 800° C., from about 200° C. to about 700° C., from about 300° C. to about 600° C., or from about 400° C. to about 500° C., including all ranges and subranges therebetween. This temperature differential may allow the polymeric material to be molded to the glass substrate without melting or otherwise negatively impacting the glass substrate during the molding process. In other embodiments, the glass substrate may have a first melting temperature $T_{m1}$ that is greater than a second melting temperature $T_{m2}$ of the polymeric film and/or a first viscosity $v_1$ that is greater than a second viscosity $v_2$ of the polymeric film at a given processing temperature.

The glass substrate, polymeric film, and/or LGP can, in certain embodiments be transparent or substantially transparent. As used herein, the term "transparent" is intended to denote that the substrate, film, or LGP has an optical transmission of greater than about 80% in the visible region of the spectrum (~420-750 nm). For instance, an exemplary transparent material may have greater than about 85% transmittance in the visible light range, such as greater than about 90%, greater than about 95%, or greater than about 99% transmittance, including all ranges and subranges therebetween. In certain embodiments, an exemplary transparent material may have an optical transmittance of greater than about 50% in the ultraviolet (UV) region (~100-400 nm), such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween.

The optical light scattering characteristics of the LGP may also be affected by the refractive index of the glass and polymeric materials. According to various embodiments, the glass may have a refractive index ranging from about 1.3 to about 1.8, such as from about 1.35 to about 1.7, from about 1.4 to about 1.65, from about 1.45 to about 1.6, or from about 1.5 to about 1.55, including all ranges and subranges therebetween. In some embodiments, the polymeric material may have an index of refraction substantially similar to that of the glass substrate. As used herein, the term "substantially similar" is intended to denote that two values are approximately equal, e.g., within about 10% of each other, such as within about 5% of each other, or within about 2% of each other in some cases. For example, in the case of a refractive index of 1.5, a substantially similar refractive index may range from about 1.35 to about 1.65.

According to various non-limiting embodiments, the LGP (glass+polymer) may have a relatively low level of light attenuation (e.g., due to absorption and/or scattering). For example, a combined attenuation for the LGP may be expressed as $\alpha'=(d_1/D)*\alpha_1+(d_2/D)*\alpha_2$, in which $d_1$ represents the overall thickness of the transparent substrate, $d_2$ represents the overall thickness of the polymeric film, D represents the overall thickness of the LGP (D=$d_1$+$d_2$), $\alpha_1$ represents the attenuation value of the transparent substrate, and $\alpha_2$ represents the attenuation value of the polymeric film. In certain embodiments, $\alpha'$ may be less than about 5 dB/m for wavelengths ranging from about 420-750 nm. For instance, $\alpha'$ may be less than about 4 dB/m, less than about 3 dB/m, less than about 2 dB/m, less than about 1 dB/m, less than about 0.5 dB/m, less than about 0.2 dB/m, or even less, including all ranges and subranges therebetween, e.g., from about 0.2 dB/m to about 5 dB/m. The combined attenuation of the LGP may vary depending, e.g., upon the thickness of the polymeric film and/or the ratio of overall polymer film thickness to overall LGP thickness ($d_2$/D). As such, the polymeric film thickness and/or glass substrate thicknesses may be varied to achieve a desired attenuation value. For instance, ($d_2$/D) may range from about ½ to about 1/50, such as from about ⅓ to about 1/40, from about ⅕ to about 1/30, or from about 1/10 to about 1/20, including all ranges and subranges therebetween.

The LGPs disclosed herein may be used in various display devices including, but not limited to LCDs. According to various aspects of the disclosure, display devices can comprise at least one of the disclosed LGPs coupled to at least one light source, which may emit blue, UV, or near-UV light (e.g., approximately 100-500 nm). In some embodiments, the light source may be a light emitting diode (LED). The optical components of an exemplary LCD may further comprise a reflector, a diffuser, one or more prism films, one or more linear or reflecting polarizers, a thin film transistor (TFT) array, a liquid crystal layer, and one or more color filters, to name a few components. The LGPs disclosed herein may also be used in various illuminating devices, such as luminaires or solid state lighting devices.

Thus, in some embodiments a light guide assembly is provided comprising a light guide plate with a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, and at least one light source optically coupled to the edge surface of the glass substrate, wherein the aspect ratio is represented as $w/d_2$ and is between 0.1 and 8. In further embodiments, a light guide assembly is provided comprising a light guide plate with a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, and at least one light source optically coupled to the edge surface of the glass substrate, wherein the aspect ratio is represented as $w/[d_2-t]$ and is between 0.1 and 8. In further embodiments, the aspect ratio is between 2 and 5. In some embodiments, the polymeric film further comprises a polymeric platform having a thickness t, and wherein the aspect ratio is represented as $(w/[d_2-t])$. In some embodiments, the height $d_2$ of each of the plurality of microstructures does not exceed 20 μm. In some embodiments, w is between about 5 μm and about 500 μm. Some embodiments further comprise a first spacing between adjacent microstructures in a first direction, the first spacing being between 0.01*w and 4*w. In some embodiments, the first spacing is different between ones of the plurality of microstructures. In some embodiments, a second spacing between two adjacent microstructures in a second direction orthogonal to the first direction is between 10 μm and 5000 μm. In some embodiments, the second spacing is different between ones of the plurality of microstructures. In some embodiments, each of the plurality of microstructures further comprises a length l, and wherein l is different between ones of the plurality of microstructures. In some embodiments, a slope angle of an end surface of ones of the plurality of microstructure is less than about 10 degrees. In some embodiments, the substrate and the plurality of microstructures comprise the same material. In some embodiments, a refractive index difference between the substrate and the plurality of microstructures is less than 15%. In some embodiments, the thickness t of the polymeric platform does not exceed 15 microns. In some embodiments, the sum of the height $d_2$ and the thickness t does not exceed 25 microns in total. In some embodiments, the glass substrate comprises a color shift Δy of less than about 0.015. In some embodiments, the glass substrate comprises, on a mol % oxide basis: 50-90 mol % $SiO_2$, 0-20 mol % $Al_2O_3$, 0-20 mol % $B_2O_3$, and 0-25 mol % $R_xO$, wherein x is 2 and R is chosen from Li, Na, K, Rb, Cs, and combinations thereof, or wherein x is 1 and R is chosen from Zn, Mg, Ca, Sr, Ba, and combinations thereof. In some embodiments, a thickness $d_1$ of the glass substrate ranges from about 0.1 mm to about 3 mm. In some embodiments, the polymeric film comprises a UV curable or thermally curable polymer. In some embodiments, the polymeric film is microreplicated, screen printed, ink jet printed, laser bonded, printed, or grown onto the light emitting surface of the glass substrate. In some embodiments, the plurality of microstructures comprises a periodic or non-periodic array of prisms, rounded prisms, or lenticular lenses. In some embodiments, the glass substrate further comprises a plurality of light extraction features patterned on a major surface opposite the light emitting surface. Some embodiments further comprise at least one second light source optically coupled to a second edge surface of the glass substrate and, optionally, a second polymeric film comprising a plurality of microstructures disposed on a major surface opposite the light emitting surface.

In further embodiments a light guide plate is provided comprising a glass substrate having an edge surface and a light emitting surface and a polymeric film disposed adjacent to the light emitting surface of the glass substrate, the polymeric film comprising a plurality of microstructures, each microstructure having a height $d_2$ and a width w defining an aspect ratio, wherein the aspect ratio is represented as $w/d_2$ and is between 0.1 and 8. In additional embodiments a light guide plate is provided comprising a glass substrate having an edge surface and a light emitting surface, and a polymeric film disposed adjacent to the light emitting surface of the glass substrate, the polymeric film comprising a plurality of microstructures, each microstructure having a height $d_2$ and a width w defining an aspect ratio, wherein the aspect ratio is represented as $w/[d_2-t]$ and is between 0.1 and 8. In some embodiments, the aspect ratio is between 2 and 5. In some embodiments, the polymeric film further comprises a polymeric platform having a thickness t, and wherein the aspect ratio is represented as $(w/[d_2-t])$. In some embodiments, the height $d_2$ of each of the plurality of microstructures does not exceed 20 μm. In some embodiments, w is between about 5 μm and about 500 μm. In some embodiments, a first spacing between two adjacent microstructures in a first direction is between 0.01*w and 4*w. In some embodiments, the first spacing is different between ones of the plurality of microstructures. In some embodiments, a second spacing between two adjacent microstructures in a second direction orthogonal to the first direction is between 10 μm and 5000 μm. In some embodiments, the second spacing is different between ones of the plurality of microstructures. In some embodiments, each of the plurality of microstructures further comprises a length l, and wherein l is different between ones of the plurality of microstructures. In some embodiments, a slope angle of an end surface of ones of the plurality of microstructures is less than about 15 degrees. In some embodiments, the substrate and the plurality of microstructures comprise the same material. In some embodiments, a refractive index difference between the substrate and the plurality of microstructures is less than 10%. In some embodiments, the thickness t of the polymeric platform does not exceed 15 microns. In some embodiments, the sum of the height $d_2$ and the thickness t does not exceed 25 microns in total. In some embodiments, the glass substrate comprises a color shift Δy of less than about 0.015. In some embodiments, the glass substrate comprises, on a mol % oxide basis: 50-90 mol % $SiO_2$, 0-20 mol % $Al_2O_3$, 0-20 mol % $B_2O_3$, and 0-25 mol % $R_xO$, wherein x is 2 and R is chosen from Li, Na, K, Rb, Cs, and combinations thereof, or wherein x is 1 and R is chosen from Zn, Mg, Ca, Sr, Ba, and combinations thereof. In some embodiments, a thickness $d_1$ of the glass substrate ranges from about 0.1 mm to about 3 mm. In some embodiments, the polymeric film comprises a UV curable or thermally curable polymer. In some embodiments, the polymeric film is microreplicated, screen printed, ink jet printed, laser bonded, printed, or grown onto the light emitting surface of the glass substrate. In some embodiments, the plurality of microstructures comprises a periodic or non-periodic array of prisms, rounded prisms, or lenticular lenses. In some embodiments, the glass substrate further comprises a plurality of light extraction features patterned on a major surface opposite the light emitting surface. Some embodiments comprise at least one second light source optically coupled to a second edge surface of the glass substrate and, optionally, a second polymeric film comprising a plurality of microstructures disposed on a major surface opposite the light emitting surface.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" or an "array" is intended to denote "more than one." As such, a "plurality of light scattering features" includes two or more such features, such as three or more such features, etc., and an "array of microstructures" includes two or more such microstructures, such as three or more such microstructures, and so on.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A light guide assembly comprising:
   (a) a light guide plate comprising:
      (i) a glass substrate having an edge surface and a light emitting surface; and
      (ii) a polymeric film disposed on the light emitting surface of the glass substrate, the polymeric film comprising a plurality of microstructures, each microstructure having a height $d_2$ and a width w defining an aspect ratio, the height $d_2$ measured from the glass substrate, and the plurality of microstructures comprises rounded prisms or lenticular lenses; and
   (b) at least one light source optically coupled to the edge surface of the glass substrate,
   wherein the aspect ratio is represented as $w/d_2$ and is between 2 and 5, and a slope angle of an end surface of a microstructure of the plurality of microstructure is less than about 15 degrees.

2. A light guide assembly comprising:
   (a) a light guide plate comprising:
      (i) a glass substrate having an edge surface and a light emitting surface; and
      (ii) a polymeric film disposed on the light emitting surface of the glass substrate, the polymeric film comprising a polymeric platform comprising a thickness t and a plurality of microstructures, each microstructure having a height $d_2$ and a width w defining an aspect ratio, the height $d_2$ measured from the glass substrate, and the plurality of microstructures comprises rounded prisms or lenticular lenses; and
   (b) at least one light source optically coupled to the edge surface of the glass substrate,
   wherein the aspect ratio is represented as $w/[d_2-t]$ and is between 2 and 5, and a slope angle of an end surface of a microstructure of the plurality of microstructure is less than about 15 degrees.

3. The light guide assembly of claim 1 or 2, wherein the height $d_2$ of each of the plurality of microstructures does not exceed 20 μm.

4. The light guide assembly of claim 1 or 2, wherein w is between about 5 μm and about 500 μm.

5. The light guide assembly of claim 1 or 2 further comprising a first spacing between two adjacent microstructures in a first direction, the first spacing being between 0.01*w and 4*w.

6. The light guide assembly of claim 5, wherein the first spacing is different between a first adjacent microstructures of the plurality of microstructures and a second adjacent microstructures of the plurality of microstructures.

7. The light guide assembly of claim 5, wherein a second spacing between two adjacent microstructures in a second direction orthogonal to the first direction is between 10 μm and 5000 μm.

8. The light guide assembly of claim 7, wherein the second spacing is different between a first adjacent microstructures of the plurality of microstructures and a second adjacent microstructures of the plurality of microstructures.

9. The light guide assembly of claim 7, wherein each of the plurality of microstructures further comprises a length 1, and wherein 1 is different between a microstructure of the plurality of microstructures and an another microstructure of the plurality of microstructures.

10. The light guide assembly of claim 1 or 2, wherein the slope angle is less than about 10 degrees.

11. The light guide assembly of claim 1 or 2, wherein a refractive index difference between the substrate and the plurality of microstructures is less than 10%.

12. The light guide assembly of claim 2, wherein the thickness t of the polymeric platform does not exceed 15 μm.

13. The light guide assembly of claim 1 or 2, wherein the height $d_2$ does not exceed 25 μm.

14. The light guide assembly of claim 1 or 2, wherein the glass substrate comprises a color shift Δy of less than about 0.015.

15. The light guide assembly of claim 1 or 2, wherein the glass substrate comprises, on a mol % oxide basis:
50-90 mol % $SiO_2$,
0-20 mol % $Al_2O_3$,
0-20 mol % $B_2O_3$, and
0-25 mol % $R_xO$,
wherein x is 2 and R is chosen from Li, Na, K, Rb, Cs, and combinations thereof, or wherein x is 1 and R is chosen from Zn, Mg, Ca, Sr, Ba, and combinations thereof.

16. The light guide assembly of claim 1 or 2, wherein a thickness $d_1$ of the glass substrate ranges from about 0.1 mm to about 3 mm.

17. The light guide assembly of claim 1 or 2, wherein the polymeric film comprises a UV curable or thermally curable polymer.

18. The light guide assembly of claim 1 or 2, wherein the polymeric film is microreplicated, screen printed, ink jet printed, laser bonded, printed, or grown onto the light emitting surface of the glass substrate.

19. The light guide assembly of claim 1 or 2, wherein the glass substrate further comprises a plurality of light extraction features patterned on a major surface opposite the light emitting surface.

20. The light guide assembly of claim 1 or 2, further comprising at least one second light source optically coupled to a second edge surface of the glass substrate and, optionally, a second polymeric film comprising a plurality of microstructures disposed on a major surface opposite the light emitting surface.

21. A display, lighting, or electronic device comprising the light guide assembly of claim 1 or 2.

22. The light guide assembly of claim 1 or 2, further comprising a second light guide plate stacked on the light guide plate, the second light guide plate comprising
 (i) a glass substrate having an edge surface and a light emitting surface; and
 (ii) a polymeric film disposed on the light emitting surface of the glass substrate, the polymeric film comprising a plurality of microstructures, each microstructure having a height $d_2$ and a width w defining an aspect ratio,
wherein the plurality of microstructures on the second light plate are orthogonal to the plurality of microstructures on the first light guide plate.

23. A light guide plate comprising:
a glass substrate having an edge surface and a light emitting surface; and
a polymeric film disposed on the light emitting surface of the glass substrate, the polymeric film comprising a plurality of microstructures, each microstructure having a height $d_2$ and a width w defining an aspect ratio, the height $d_2$ measured from the glass substrate, and the plurality of microstructures comprises rounded prisms or lenticular lenses,
wherein the aspect ratio is represented as $w/d_2$ and is between 2 and 5, and a slope angle of an end surface of a microstructure of the plurality of microstructure is less than about 15 degrees.

24. A light guide plate comprising:
a glass substrate having an edge surface and a light emitting surface; and
a polymeric film disposed on the light emitting surface of the glass substrate, the polymeric film comprising a polymeric platform comprising a thickness t and a plurality of microstructures, each microstructure having a height $d_2$ and a width w defining an aspect ratio, the height $d_2$ measured from the glass substrate, and the plurality of microstructures comprises rounded prisms or lenticular lenses,
wherein the aspect ratio is represented as $w/[d_2-t]$ and is between 2 and 5, and a slope angle of an end surface of a microstructure of the plurality of microstructure is less than about 15 degrees.

25. The light guide plate of claim 23 or 24, wherein the height $d_2$ of each of the plurality of microstructures does not exceed 20 μm.

26. The light guide plate of claim 23 or 24, wherein w is between about 5 μm and about 500 μm.

27. The light guide plate of claim 23 or 24, wherein a first spacing between two adjacent microstructures in a first direction is between 0.01*w and 4*w.

28. The light guide plate of claim 27, wherein the first spacing is different between a first adjacent microstructures of the plurality of microstructures and a second adjacent microstructures of the plurality of microstructures.

29. The light guide plate of claim 27, wherein a second spacing between two adjacent microstructures in a second direction orthogonal to the first direction is between 10 μm and 5000 μm.

30. The light guide plate of claim 29, wherein the second spacing is different between a first adjacent microstructures of the plurality of microstructures and a second adjacent microstructures of the plurality of microstructures.

31. The light guide plate of claim 29, wherein each of the plurality of microstructures further comprises a length l, and l is different between a microstructure of the plurality of microstructures and an another microstructure of the plurality of microstructures.

32. The light guide plate of claim 23 or 24, wherein the slope angle is less than about 10 degrees.

33. The light guide plate of claim 23 or 24, wherein a refractive index difference between the substrate and the plurality of microstructures is less than 10%.

34. The light guide plate of claim 24, wherein the thickness t of the polymeric platform does not exceed 15 μm.

35. The light guide plate of claim 23 or 24, wherein height $d_2$ does not exceed 25 μm.

36. The light guide plate of claim 23 or 24, wherein the glass substrate comprises a color shift Δy of less than about 0.015.

37. The light guide plate of claim 23 or 24, wherein the glass substrate comprises, on a mol % oxide basis:
50-90 mol % $SiO_2$,
0-20 mol % $Al_2O_3$,
0-20 mol % $B_2O_3$, and
0-25 mol % $R_xO$,
wherein x is 2 and R is chosen from Li, Na, K, Rb, Cs, and combinations thereof, or wherein x is 1 and R is chosen from Zn, Mg, Ca, Sr, Ba, and combinations thereof.

38. The light guide plate of claim 23 or 24, wherein a thickness $d_1$ of the glass substrate ranges from about 0.1 mm to about 3 mm.

39. The light guide plate of claim 23 or 24, wherein the polymeric film comprises a UV curable or thermally curable polymer.

40. The light guide plate of claim 23 or 24, wherein the polymeric film is microreplicated, screen printed, ink jet printed, laser bonded, printed, or grown onto the light emitting surface of the glass substrate.

41. The light guide plate of claim 23 or 24, wherein the glass substrate further comprises a plurality of light extraction features patterned on a major surface opposite the light emitting surface.

42. The light guide plate of claim 23 or 24, further comprising at least one second light source optically coupled to a second edge surface of the glass substrate and, optionally, a second polymeric film comprising a plurality of microstructures disposed on a major surface opposite the light emitting surface.

43. A display, lighting, or electronic device comprising the light guide plate of claim 23 or 24.

44. The light guide assembly of claim 1 or 2, wherein the light guide plate comprises a color shift $\Delta y$ of less than 0.015.

45. The light guide assembly of claim 1 or 2, wherein the light guide plate comprises an attenuation of less than about 5 dB/m for wavelengths ranging from 420-750 nm.

46. The light guide plate of claim 23 or 24, wherein the light guide plate comprises a color shift $\Delta y$ of less than 0.015.

47. The light guide plate of claim 23 or 24, wherein the light guide plate comprises an attenuation of less than about 5 dB/m for wavelengths ranging from 420-750 nm.

* * * * *